US010225572B2

(12) United States Patent
Chou et al.

(10) Patent No.: US 10,225,572 B2
(45) Date of Patent: Mar. 5, 2019

(54) CONFIGURABLE MOTION ESTIMATION SEARCH SYSTEMS AND METHODS

(71) Applicant: Apple Inc., Cupertino, CA (US)

(72) Inventors: Jim C. Chou, San Jose, CA (US); Mark P. Rygh, Union City, CA (US); Guy Côté, San Jose, CA (US)

(73) Assignee: Apple Inc., Cupertino, CA (US)

( * ) Notice: Subject to any disclaimer, the term of this patent is extended or adjusted under 35 U.S.C. 154(b) by 661 days.

(21) Appl. No.: 14/871,848

(22) Filed: Sep. 30, 2015

(65) Prior Publication Data

US 2017/0094293 A1    Mar. 30, 2017

(51) Int. Cl.
*H04N 7/12* (2006.01)
*H04N 11/02* (2006.01)
*H04N 11/04* (2006.01)
*H04N 19/42* (2014.01)
*H04N 19/139* (2014.01)
(Continued)

(52) U.S. Cl.
CPC ......... *H04N 19/439* (2014.11); *H04N 19/109* (2014.11); *H04N 19/139* (2014.11); *H04N 19/147* (2014.11); *H04N 19/156* (2014.11); *H04N 19/157* (2014.11);
(Continued)

(58) Field of Classification Search
CPC ...... H04N 19/52; H04N 19/583; H04N 19/59; H04N 19/567; H04N 19/587; H04N 19/573; H04N 19/61; H04N 19/533; H04N 19/523; H04N 19/156; H04N 19/57
See application file for complete search history.

(56) References Cited

U.S. PATENT DOCUMENTS

| 6,724,823 B2 | 4/2004 | Rovati et al. |
| 7,099,392 B2 * | 8/2006 | Kim ...................... H04N 5/145 348/699 |

(Continued)

OTHER PUBLICATIONS

Nunez-Yanez, et al.; "A Configurable and Programmable Motion Estimation Processor for the H.265 Video Codec," IEEE. In Field Programmable Logic and Applications, 2008. FPL 2008. International Conference on (pp. 149-154).

*Primary Examiner* — Jeremiah C Hallenbeck-Huber
*Assistant Examiner* — Boubacar Abdou Tchoussou
(74) *Attorney, Agent, or Firm* — Fletcher Yoder PC

(57) ABSTRACT

System and method for improving operational efficiency of a video encoding pipeline used to encode image data. The video encoding pipeline includes a motion estimation setup block, which dynamically adjusts a setup configuration of the motion estimation block based at least in part on operational parameters of the video encoding pipeline and select an initial candidate inter-frame prediction mode based at least on the setup configuration, a full-pel motion estimation block, which determines an intermediate candidate inter-frame prediction mode by performing a motion estimation search based on the initial candidate inter-frame prediction mode, a sub-pel motion estimation block, which determines a final candidate inter-frame prediction by performing a motion estimation search based on the intermediate candidate inter-frame prediction mode, and a mode decision block, which determines a rate-distortion cost associated with the final candidate inter-frame prediction mode and determines a prediction mode used to prediction encoding the image data.

20 Claims, 13 Drawing Sheets

(51) Int. Cl.
*H04N 19/147* (2014.01)
*H04N 19/182* (2014.01)
*H04N 19/186* (2014.01)
*H04N 19/109* (2014.01)
*H04N 19/156* (2014.01)
*H04N 19/157* (2014.01)
*H04N 19/17* (2014.01)

(52) U.S. Cl.
CPC ........... *H04N 19/17* (2014.11); *H04N 19/182* (2014.11); *H04N 19/186* (2014.11)

(56) References Cited

U.S. PATENT DOCUMENTS

| | | | |
|---|---|---|---|
| 7,782,951 B2 | 8/2010 | Muthukrishnan et al. | |
| 7,809,063 B2 * | 10/2010 | Lin | H04N 19/139 |
| | | | 375/240 |
| 8,073,056 B2 * | 12/2011 | Kim | H04N 5/145 |
| | | | 348/699 |
| 8,144,766 B2 * | 3/2012 | Nakazato | H04N 19/56 |
| | | | 375/240.01 |
| 8,175,160 B1 | 5/2012 | Arici et al. | |
| 2002/0172287 A1 * | 11/2002 | Kim | H04N 5/145 |
| | | | 375/240.16 |
| 2005/0053136 A1 * | 3/2005 | Yu | H04N 19/176 |
| | | | 375/240.16 |
| 2006/0188019 A1 * | 8/2006 | Lin | H04N 19/139 |
| | | | 375/240.16 |
| 2008/0212679 A1 * | 9/2008 | Lin | H04N 19/423 |
| | | | 375/240.16 |
| 2010/0014001 A1 * | 1/2010 | Nakazato | H04N 19/56 |
| | | | 348/699 |
| 2012/0195368 A1 * | 8/2012 | Chien | H04N 19/52 |
| | | | 375/240.02 |
| 2015/0181208 A1 * | 6/2015 | Park | H04N 19/00206 |
| | | | 375/240.02 |

* cited by examiner

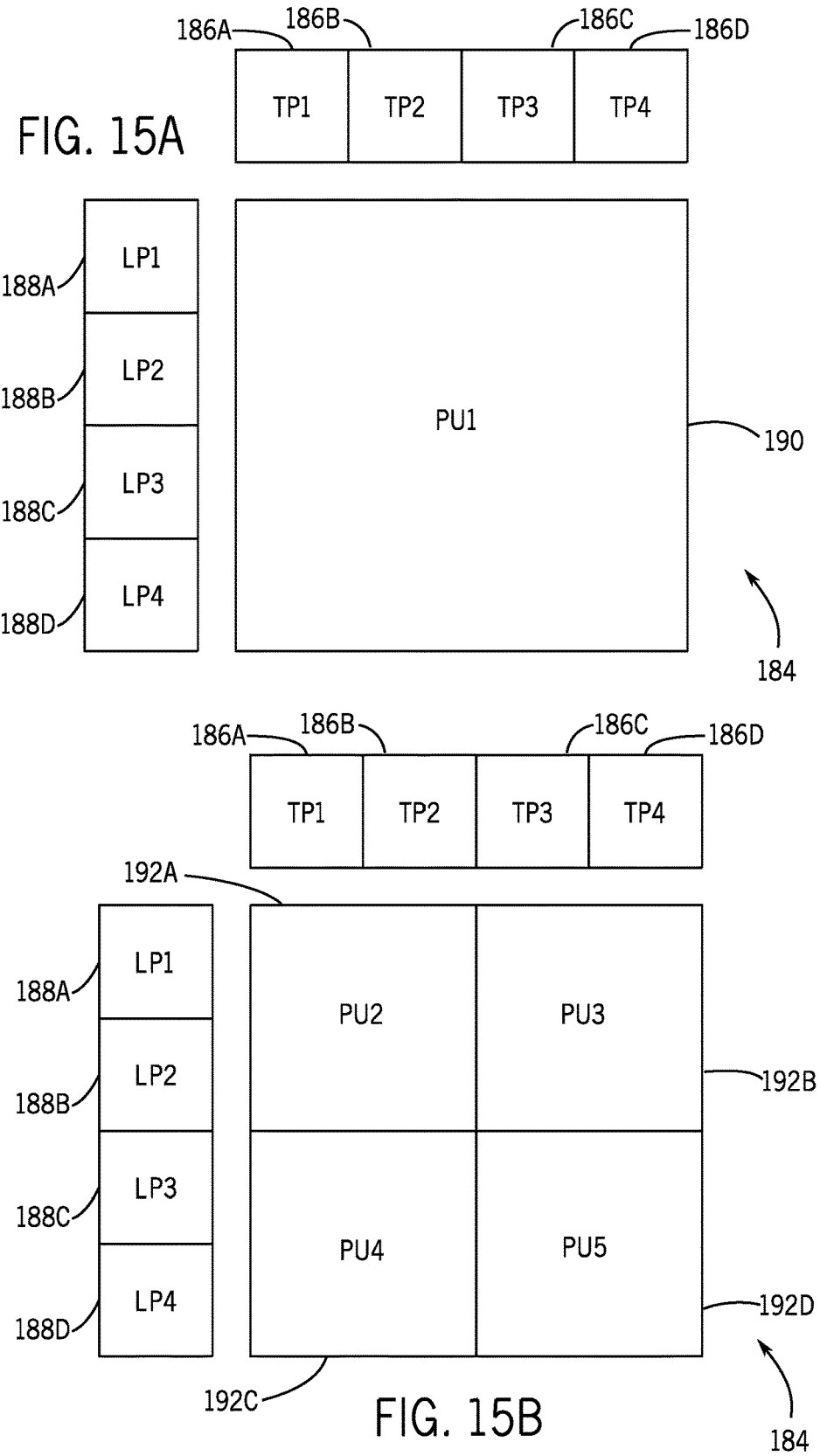

CONFIGURABLE MOTION ESTIMATION SEARCH SYSTEMS AND METHODS

BACKGROUND

The present disclosure generally relates to image data encoding and, more particularly, to motion estimation used for image data encoding.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Often, an electronic device may present visual representations of information as image frames displayed on an electronic display based on image data. Since image data may be received from another electronic device and/or stored in the electronic device, the image data may be encoded (e.g., compressed) to reduce size (e.g., number of bits) and, thus, resources (e.g., transmission bandwidth and/or memory addresses) used to transmit and/or store image data. To display image frames, the electronic device may decode encoded image data and instruct the electronic display to adjust luminance of display pixels based on the decoded image data.

To facilitate encoding, prediction techniques may be used to indicate the image data by referencing other image data. For example, since successively displayed image frames may be generally similar, inter-frame prediction techniques may be used to indicate image data (e.g., a prediction unit) corresponding with a first image frame by referencing image data (e.g., a reference sample) corresponding with a second image frame, which may be displayed directly before or directly after the first image frame. To facilitate identifying the reference sample, a motion vector may indicate position of a reference sample in the second image frame relative to position of a prediction unit in the first image frame. In other words, instead of directly compressing the image data, the image data may be encoded based at least in part on a motion vector used to indicate desired value of the image data.

In some instances, image data may be captured for real-time or near real-time display and/or transmission. For example, when an image sensor (e.g., digital camera) captures image data, an electronic display may shortly thereafter display image frames based on the captured image data. Additionally or alternatively, an electronic device may shortly thereafter transmit the image frames to another electronic device and/or a network. As such, the ability to display and/or transmit in real-time or near real-time may be based at least in part on efficiency with which the image data is encoded, for example, using inter-frame prediction techniques. However, determining motion vectors used to encode image data with inter-frame prediction techniques may be computationally complex, for example, due to amount of image data searched to determine candidate motion vectors.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to encoding source image data, which may enable reducing transmission bandwidth and/or memory usage. To facilitate encoding, a motion estimation block may be initialized (e.g., setup) with one or more initial candidate inter-frame prediction modes. The motion estimation block may then perform a motion estimation search within a pixel area around a location indicated by a candidate inter-frame prediction. Based on the motion estimation search, the motion estimation block may determine a reference sample used to encode a prediction unit and a final candidate inter-frame prediction mode, which indicates location of the reference sample relative to the prediction unit.

To facilitate real-time or near real-time transmission and/or display of encoded image data, operational efficiency of the motion estimation block may be improved. In some embodiments, operational efficiency may be improved by enabling dynamic adjustment of the motion estimation block setup configuration. As used herein, the "setup configuration" is intended to describe setup parameters used to control operation of the motion estimation block, such as selection of initial candidate inter-frame configurations evaluated by the motion estimation block and/or performance of motion estimation searches.

For example, setup configuration of the motion estimation block may be dynamically adjusted based at least in part on operational parameters of the video encoding pipeline, such as image frame resolution, display refresh rate, and/or desire power consumption. In some embodiments, the motion estimation block may determine a desired operating duration of the motion estimation block based on such operational parameters. The motion estimation block may then dynamically adjust the setup configuration that is expected to comply with the desired operating duration, for example, to adjust the number of motion estimation searches performed per coding unit.

To facilitate adjusting (e.g., reducing) operating duration of the motion estimation block, quality of the initial candidate inter-frame prediction modes (e.g., likelihood that initial candidate inter-frame prediction modes identify a good reference sample) used by the motion estimation block may be improved. In some embodiments, the quality may be affected by number of each type of initial candidate inter-frame prediction mode, such as number of predictor inter-frame prediction modes to select.

Generally, a predictor inter-frame prediction mode may be determined based on inter-frame prediction mode selected for one or more spatially or temporally adjacent prediction units. In some instances, location of a first reference sample relative to a first prediction unit may be similar to location of a second reference sample relative to a second (e.g., (e.g., spatially or temporally related) prediction unit. Accordingly, selecting a predictor inter-frame prediction mode determined based on a related inter-frame prediction mode (e.g., inter-frame prediction mode selected for a related prediction unit) as an initial candidate inter-frame predictions mode may improve quality.

To further improve operational efficiency, the motion estimation block may select initial candidate inter-frame prediction modes to reduce amount of pixel search are overlap between motion estimation searches. As described above, the motion estimation block may search a pixel area around location indicated by a candidate inter-frame prediction mode to determine a reference sample. Thus, in some instances, the pixel-search-area corresponding with multiple initial candidate inter-frame prediction modes may overlap.

Thus, in some embodiments, the motion estimation block may select initial candidate inter-frame prediction modes based at least in part on location and/or resulting overlap. For example, in some embodiments, the motion estimation block may replace an initial candidate inter-frame prediction mode when it results in overlap greater than an upper threshold. Additionally, the motion estimation block may utilize the initial candidate inter-frame prediction mode when it results in overlap less than a lower threshold. Furthermore, when it results in overlap between the upper and the lower thresholds, the motion estimation block may adjust the initial candidate inter-frame prediction mode to move location indicated such that the overlap is reduced.

BRIEF DESCRIPTION OF THE DRAWINGS

Various aspects of this disclosure may be better understood upon reading the following detailed description and upon reference to the drawings in which:

FIGS. 15A-15C are diagrammatic representations of the coding unit of FIG. 14 in various prediction unit configurations, in accordance with an embodiment;

DETAILED DESCRIPTION

Figure 1:
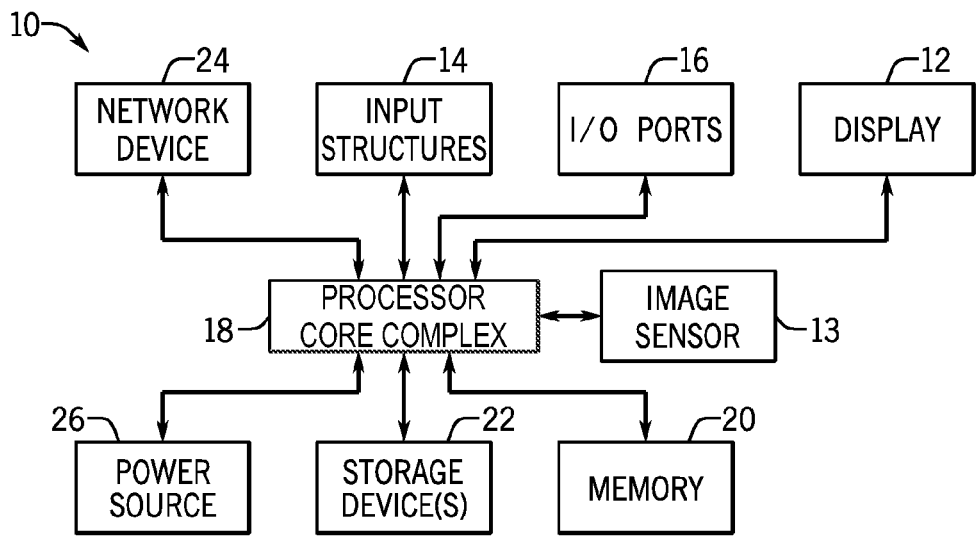
FIG. 1 is a block diagram of an electronic device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electronic device may facilitate visually presenting information by instructing an electronic display to display image frames based on image data. In some embodiments, the image data may be generated by an image sensor (e.g., digital camera) and stored in the electronic device. Additionally, when the image data is generated external from the electronic display, the image data may be transmitted to the electronic device. To reduce resource usage, image data may be encoded (e.g., compressed) to reduce size (e.g., number of bits) which, for example, may reduce transmission bandwidth and/or memory address usage.

In some embodiments, a video encoding pipeline may determine encoding parameters and implement the encoding parameters to encode source image data. To facilitate encoding, source image data for an image frame may be divided into one or more coding units. As used herein, a "coding unit" is intended to describe a sample of source image data (e.g., pixel image data) corresponding to a group of display pixels in an image frame, which is encoded using the same prediction technique (e.g., intra-frame prediction techniques or inter-frame prediction techniques).

Accordingly, the video encoding pipeline may determine a prediction technique to implement on a coding unit to generate a prediction sample. Prediction techniques may facilitate encoding by enabling the source image data to be indicated via reference to other image data. For example, since an image frame may change gradually, the video encoding pipeline may utilize intra-frame prediction techniques to produce a prediction sample based on image data used to display the same image frame. Additionally, since successively displayed image frames may change gradually, the video encoding pipeline may utilize inter-frame prediction techniques to produce a prediction sample based on image data used to display other image frames.

Although conceptually similar, each prediction technique may include one or more prediction modes that utilize different encoding schemes. As such, different prediction modes may result in different prediction samples. For example, utilizing a first intra-frame prediction mode (e.g., vertical prediction mode), the video encoding pipeline may produce a prediction sample with each column set equal to image data for a pixel directly above the column. On the other hand, utilizing a second intra-frame prediction mode (e.g., DC prediction mode), the video encoding pipeline may produce a prediction sample set equal to an average of adjacent pixel image data. Additionally, utilizing a first inter-frame prediction mode (e.g., first reference index and first motion vector), the video encoding pipeline may produce a prediction sample based on a reference sample at a first position within a first image frame. On the other hand, utilizing a second inter-frame prediction mode (e.g., second reference index and second motion vector), the video encoding pipeline may produce a prediction sample based on a reference sample at a second position within a second image frame.

Although using the same prediction technique, a coding unit may be predicted using one or more different prediction modes. As using herein, a "prediction unit" is intended to describe a sample within a coding unit that utilizes the same prediction mode. In some embodiments, a coding unit may include a single prediction unit. In other embodiments, the coding unit may be divided into multiple prediction units, which each uses a different prediction mode.

Accordingly, the video encoding pipeline may evaluate candidate prediction modes (e.g., candidate inter-frame prediction modes, candidate intra-frame prediction modes, and/or a skip mode) to determine what prediction mode to use for each prediction unit in a coding unit. To facilitate, a motion estimation (ME) block in the video encoding pipeline may determine one or more candidate inter-frame prediction modes. In some embodiments, an inter-frame prediction mode may include a reference index, which indicates image frame (e.g., temporal position) a reference sample is located, and a motion vector, which indicates position (e.g., spatial position) of the reference sample relative to a prediction unit.

To determine a candidate inter-frame prediction mode, the motion estimation block may search image data (e.g., reconstructed samples) used to display other image frames for reference samples that are sufficiently similar to a prediction unit. Once a reference sample is determined, the motion estimation block may determine a motion vector and reference index to indicate location of the reference sample.

Additionally, as described above, a coding unit may include one or more prediction units. In fact, the coding unit may have multiple possible prediction unit configurations. In some embodiments, the coding unit may include a variable number of prediction units with variable sizes at variable locations within the coding unit. For example, a 32×32 coding unit may include a single 32×32 prediction unit, two 16×32 prediction units, two 32×16 prediction units, or four 16×16 prediction units. Thus, the motion estimation block may determine candidate inter-frame prediction modes for the various possible prediction unit configurations. For example, the motion estimation block may determine candidate inter-frame prediction modes for the 32×32 prediction unit, candidate inter-frame prediction modes for the 32×16 prediction units, candidate inter-frame prediction modes for the 16×32 prediction units, candidate inter-frame prediction modes for the 16×16 prediction units, or any combination thereof.

Generally, the quality of the match between prediction unit and reference sample may be dependent on pixel-search-area (e.g., amount of image data searched). For example, increasing pixel-search-area may improve likelihood of finding a closer match with a prediction unit. However, increasing pixel-search-area may also increase computation complexity and, thus, operating (e.g., searching) duration of the motion estimation block and, thus, the video encoding pipeline. In some embodiments, duration provided for the motion estimation block to perform its search may be limited, for example, to enable real-time or near real-time transmission and/or display.

Accordingly, the present disclosure provides techniques to improve operational efficiency of a video encoding pipeline and, particularly, a motion estimation block in a main pipeline. In some embodiments, operational efficiency may be improved by improving setup (e.g., initialization) of the motion estimation block. During setup, the motion estimation block may be initialized with one or more initial candidate inter-frame prediction modes. The motion estimation block may then perform a motion estimation search within a pixel (e.g., integer and/or fractional) area around a location indicated by a candidate inter-frame prediction mode. Based on the motion estimation search, the motion estimation block may determine a reference sample used to encode a prediction unit and a final candidate inter-frame prediction mode, which indicates location of the reference sample relative to the prediction unit.

In some embodiments, the motion estimation block may operate based at least in part on its setup configuration. As used herein, the "setup configuration" is intended to describe setup parameters used to control operation of the motion estimation block, such as selection of initial candidate inter-frame configurations evaluated by the motion estimation block and/or performance of motion estimation searches. For example, implementing a first setup configuration, the motion estimation block may select forty 16×16 initial candidate inter-frame prediction modes and seven 32×32 initial candidate inter-frame prediction modes per 32×32 coding unit. On the other hand, implementing a second setup configuration, the motion estimation block may select eight 16×16 initial candidate inter-frame prediction modes and one 32×32 initial candidate inter-frame prediction mode per 32×32 coding unit. Thus, the operating duration of the motion estimation block may vary based at least in part on setup configuration implemented.

As described above, operating duration provide the video encoding pipeline to generate encoded image data may be limited, for example, to enable real-time or near real-time display and/or transmission, duration provided to encode source image data may be limited. In some instances, the operating duration provided the video encoding pipeline, and thus the operating duration provided the motion estimation block, may be affected by operational parameters of the video encoding pipeline, such as image frame resolution, display refresh rate, and/or desired power consumption. For example, as image frame resolution and/or display refresh rate increases, operating duration provided the motion estimation block per coding unit may decrease.

Accordingly, operational efficiency may be improved by dynamically adjusting setup configuration of the motion estimation block based at least in part on operational parameters of the video encoding pipeline. In some embodiments, the motion estimation block may determine a desired operating duration, which may be indicated as an operation mode, based on the operational parameters of the video encoding pipeline. For example, a first operation mode (e.g., normal mode) may indicate that the desired operating duration of the motion estimation block is up to ninety-two 16×16 full-pel motion estimation searches per 32×32 coding unit. Additionally, a second operation mode (e.g., turbo mode) may indicate that the desired operating duration of the motion estimation block is up to thirty-six 16×16 full-pel motion estimation searches per 32×32 coding unit.

Based on at least in part on the operation mode, the motion estimation block may select a setup configuration that is expected to comply with the desired operating duration. For example, in the first operation mode, the motion estimation block may select and implement the first setup configuration. On the other hand, in the second operation mode, the motion estimation block may select and implement the second setup configuration. In this manner, the motion estimation block may dynamically adjust its setup configuration and, thus, operating (e.g., searching) duration, which may facilitate real-time or near real-time transmission and/or display of encoded image data.

To facilitate reducing operating duration of the motion estimation block, quality of the initial candidate inter-frame prediction modes (e.g., likelihood that initial candidate inter-frame prediction modes identify a good reference sample) used by the motion estimation block may be improved. As described above, the setup configuration may be used to control selection of the initial candidate inter-frame prediction modes. For example, the setup configuration may indicate number of each type of candidate inter-frame prediction modes to select as initial candidate inter-frame prediction modes. In some embodiments, the types of initial candidate inter-frame prediction modes may include variously sized low resolution inter-frame prediction modes, controller inter-frame prediction modes, and/or automatic inter-frame prediction modes.

Generally, a predictor inter-frame prediction mode may be determined based on inter-frame prediction mode selected for one or more related prediction units. For example, since an image frame may change gradually, location of a first reference sample relative to a first prediction unit may be similar to location of a second reference sample relative to a second prediction unit in the same image frame. Additionally, since successively displayed image frames may change gradually, location of a third reference sample relative to the prediction unit may be similar to location of a fourth reference sample relative to a co-located prediction unit in a different image frame. As such, inter-frame prediction mode selected for a prediction unit may be similar to inter-frame prediction mode selected for one or more related (e.g., spatially or temporally adjacent) prediction units.

Accordingly, selecting a predictor inter-frame prediction mode determined based on a related inter-frame prediction mode (e.g., inter-frame prediction mode selected for a related prediction unit) as an initial candidate inter-frame predictions mode may improve quality. To determine the predictor inter-frame prediction mode, the motion estimation block may receive the related inter-frame prediction mode, for example, as feedback from a mode decision block and/or from memory via direct memory access (DMA). Based at least in part on the related inter-frame prediction mode, the motion estimation block may determine the predictor inter-frame prediction mode, for example, by adjusting resolution of the related inter-frame prediction mode and/or forming inter-frame predictors from the related inter-frame prediction mode.

As described above, the motion estimation block may then perform one or more motion estimation searches based at least in part on the initial candidate inter-frame prediction modes to determine final candidate inter-frame prediction modes supplied to a mode decision block. In some embodiments the motion estimation block may sort the final candidate inter-frame prediction modes based on associated motion vector cost before output. Additionally, the mode decision block may select one or more prediction modes used to encode a coding unit based at least in part on rate-distortion cost associated with the one or more final candidate inter-frame prediction modes, one or more candidate intra-frame prediction modes, and/or a skip mode. In some embodiments, the motion vector cost and/or the rate-distortion cost associated with a candidate inter-frame prediction mode is based at least in part on estimated rate (e.g., number of bits) expected to be used to indicate a motion vector of the candidate inter-frame prediction mode.

In some embodiments, motion vector of a candidate inter-frame prediction mode may be indicated by reference to a related motion vector of a related inter-frame prediction mode, for example, as a motion vector difference (e.g., offset between the motion vector and the related motion vector). Thus, in such embodiments, the video encoding pipeline may determine the related inter-frame prediction mode to facilitate determining the estimated rate of the candidate inter-frame prediction mode. In other words, in addition to determining predictor inter-frame prediction modes, the related inter-frame prediction mode may be used to facilitate sorting candidate inter-frame prediction modes and/or selection of prediction modes.

As described above, the setup configuration may be used to control selection of the initial candidate inter-frame prediction modes. For example, the setup configuration may indicate candidates inter-frame prediction modes to select based on indicated location and/or resulting pixel-search-area. As described above, the motion estimation block may search a pixel area around the location indicated by a candidate inter-frame prediction mode to determine a reference sample. Thus, in some instances, the pixel-search-area corresponding with multiple initial candidate inter-frame prediction modes may overlap.

Accordingly, to improve operational efficiency, the motion estimation block may select initial candidate inter-frame prediction modes to reduce amount of overlap between motion estimation searches. For example, in some embodiments, the motion estimation block may replace an initial candidate inter-frame prediction mode when it results in overlap greater than an upper threshold. Additionally, the motion estimation block may utilize the initial candidate inter-frame prediction mode when it results in overlap less than a lower threshold. Furthermore, when it results in overlap between the upper and the lower thresholds, the motion estimation block may adjust the initial candidate inter-frame prediction mode to move the location indicated such that the overlap is reduced.

In addition to improving initialization, operational efficiency may be improved by improving processing of motion estimation search results. As described above, a coding unit may have multiple different possible prediction unit configurations. For example, a 32×32 coding unit may include a single 32×32 prediction unit or four 16×16 prediction units. In such instances, the search results corresponding to a small (e.g., 16×16) prediction units may be relevant to a large (e.g., 32×32) prediction unit that encompasses the small prediction unit. For example, a match metric (e.g., sum of absolute transformed difference) determined for each 16×16 prediction unit may be added together to determine a match metric for the 32×32 prediction unit.

Accordingly, when multiple small prediction units are encompassed within a large prediction unit, operational efficiency may be improved by determining motion estimation search results for the large prediction unit in parallel with the small prediction units. For example, in some embodiments, motion estimation searches for each of the 16×16 prediction units may be performed sequentially. However, during the motion estimation search for the fourth (e.g., last) 16×16 prediction unit, motion estimation block may begin determining the match metric for the 32×32 prediction unit by summing together the match metrics determined for the other 16×16 prediction units. In this manner, such techniques may facilitate reducing operating duration of the motion estimation block and, thus, facilitate displaying and/or transmitting encoded image data in real-time or near real-time.

To help illustrate, a computing (e.g., electronic) device 10 that may utilize an electronic display 12 to display image frames based on image data and/or an image sensor 13 to capture image data is described in FIG. 1. As will be described in more detail below, the computing device 10 may be any suitable computing device, such as a handheld computing device, a tablet computing device, a notebook computer, and the like. Thus, it should be noted that FIG. 1 is merely one example of a particular implementation and is intended to illustrate the types of components that may be present in the computing device 10.

In the depicted embodiment, the computing device 10 includes the electronic display 12, the image sensor 13, input structures 14, input/output (I/O) ports 16, a processor core complex 18 having one or more processor(s) or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

As depicted, the processor core complex 18 is operably coupled with local memory 20 and the main memory storage device 22. Thus, the processor core complex 18 may execute instruction stored in local memory 20 and/or the main memory storage device 22 to perform operations, such as encoding image data captured by the image sensor 13 and/or decoding image data for display on the electronic display 12. As such, the processor core complex 18 may include one or more general purpose microprocessors, one or more application specific processors (ASICs), one or more field programmable logic arrays (FPGAs), or any combination thereof.

The local memory 20 and/or the main memory storage device 22 may be tangible, non-transitory, computer-readable mediums that store instructions executable by and data to be processed by the processor core complex 18. For example, the local memory 20 may include random access memory (RAM) and the main memory storage device 22 may include read only memory (ROM), rewritable non-volatile memory such as flash memory, hard drives, optical discs, and the like. By way of example, a computer program product containing the instructions may include an operating system or an application program.

Additionally, as depicted, the processor core complex 18 is operably coupled with the network interface 24. Using the network interface 24, the computing device 10 may communicatively couple to a network and/or other computing devices. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the computing device 10 to transmit encoded image data to a network and/or receive encoded image data from the network for display on the electronic display 12.

Furthermore, as depicted, the processor core complex 18 is operably coupled with I/O ports 16, which may enable the computing device 10 to interface with various other electronic devices. For example, a portable storage device may be connected to an I/O port 16, thereby enabling the processor core complex 18 to communicate data with a portable storage device. In this manner, the I/O ports 16 may enable the computing device 10 to output encoded image data to the portable storage device and/or receive encoding image data from the portable storage device.

As depicted, the processor core complex 18 is also operably coupled to the power source 26, which may provide power to the various components in the computing device 10. The power source 26 may include any suitable source of energy, such as a rechargeable lithium polymer (Li-poly) battery and/or an alternating current (AC) power converter. Furthermore, as depicted, the processor core complex 18 is operably coupled with input structures 14, which may enable a user to interact with the computing device 10. The inputs structures 14 may include buttons, keyboards, mice, trackpads, and the like. Additionally or alternatively, the electronic display 12 may include touch components that enable user inputs to the computing device 10 by detecting occurrence and/or position of an object touching its screen (e.g., surface of the electronic display 12).

In addition to enabling user inputs, the electronic display 12 may present visual representations of information by display image frames, such as a graphical user interface (GUI) of an operating system, an application interface, a still image, or video content. As described above, the electronic display 12 may display the image frames based on image data. In some embodiments, the image data may be received from other computing devices 10, for example, via the network interface 24 and/or the I/O ports 16. Additionally or alternatively, the image data may be generated by computing device 10 using the image sensor 13. In some embodiments, image sensor 13 may digitally capture visual representations of proximate physical features as image data.

As described above, the image data may be encoded (e.g., compressed), for example by the computing device 10 that generated the image data, to reduce number of memory addresses used to store and/or bandwidth used to transmit the image data. Once generated or received, the encoded image data may be stored in local memory 20. Accordingly, to display image frames, the processor core complex 18 may retrieve encoded image data from local memory 20, decode the encoded image data, and instruct the electronic display 12 to display image frames based on the decoded image data.

Figure 2:
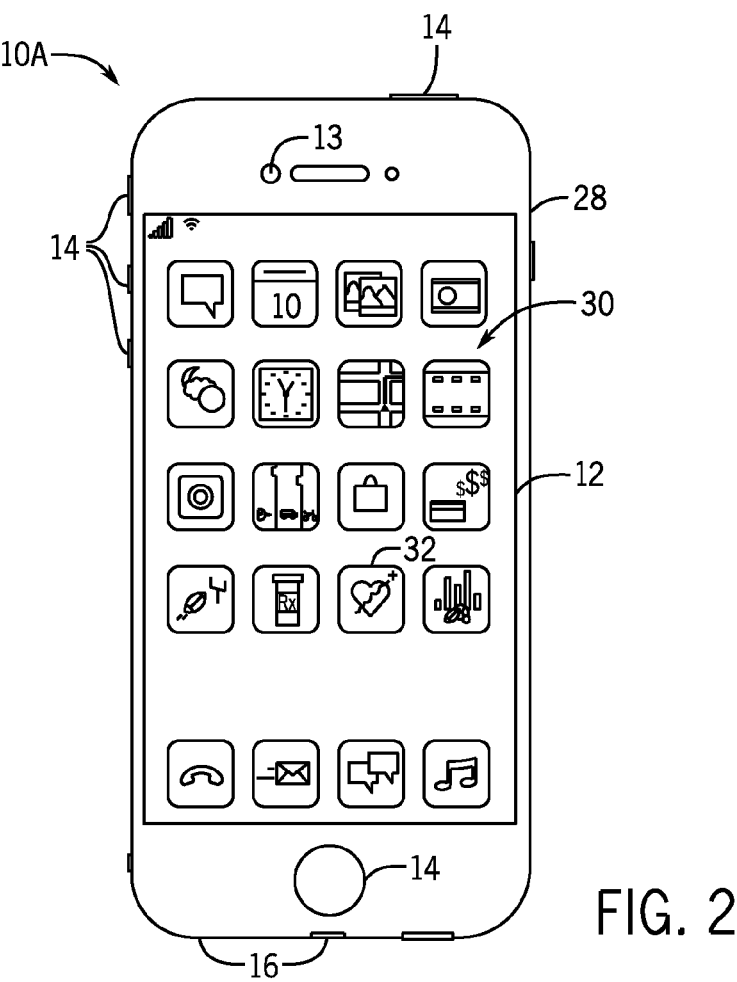
FIG. 2 is an example of the electronic device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and/or shields them from electromagnetic interference. The enclosure 28 may surround the electronic display 12, which, in the depicted embodiment, displays a graphical user interface (GUI) 30 having an array of icons 32. By way of example, when an icon 32 is selected either by an input structure 14 or a touch component of the electronic display 12, an application program may launch.

Additionally, as depicted, input structures 14 open through the enclosure 28. As described above, the input structures 14 may enable user interaction with the handheld device 10A. For example, the input structures 14 may activate or deactivate the handheld device 10A, navigate a user interface to a home screen, navigate a user interface to a user-configurable application screen, activate a voice-recognition feature, provide volume control, and/or toggle between vibrate and ring modes. As depicted, I/O ports 16 also open through the enclosure 28. In some embodiments, the I/O ports 16 may include an audio jack to connect to external devices. Furthermore, as depicted, the image sensor 13 opens through the enclosure 28. In some embodiments, the image sensor 13 may include a digital camera that captures image data.

Figure 3:
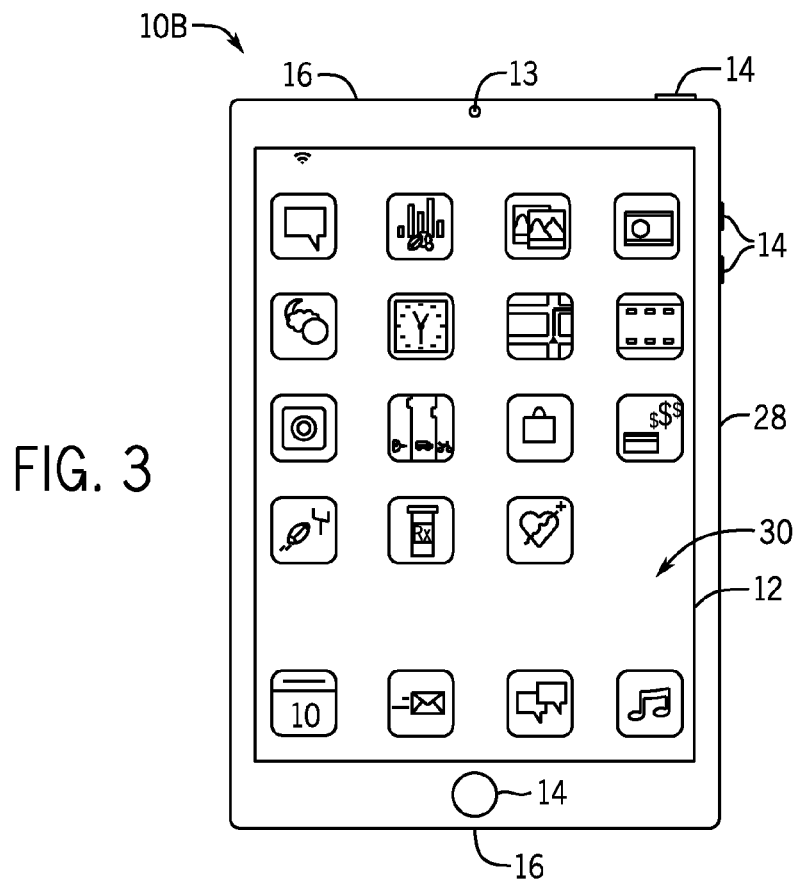
FIG. 3 is an example of the electronic device of FIG. 1, in accordance with an embodiment.
Figure 4:
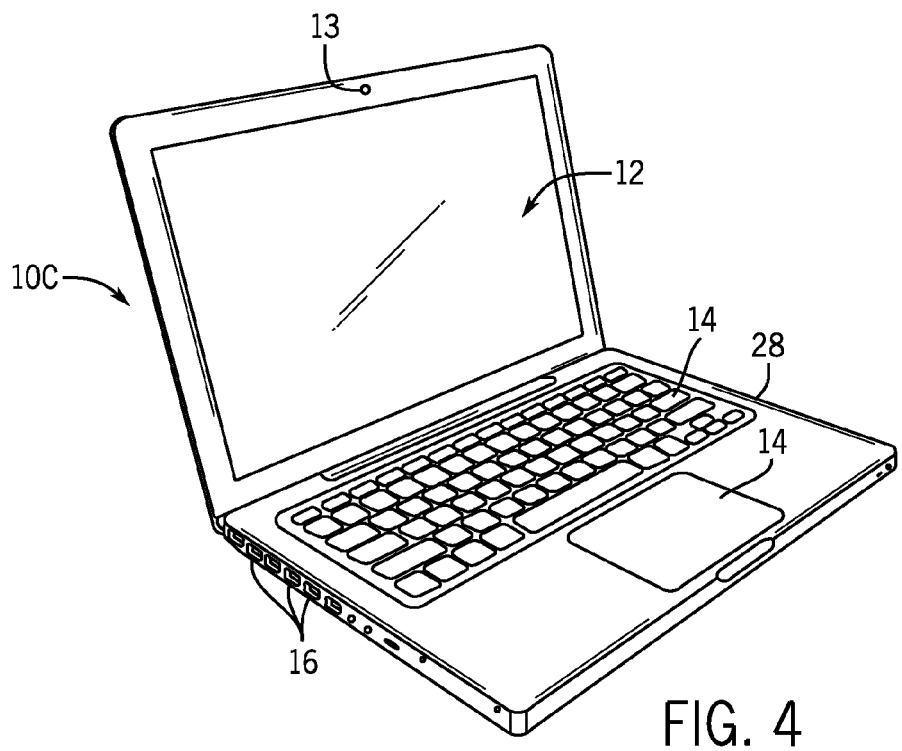
FIG. 4 is an example of the electronic device of FIG. 1, in accordance with an embodiment.
Figure 5:
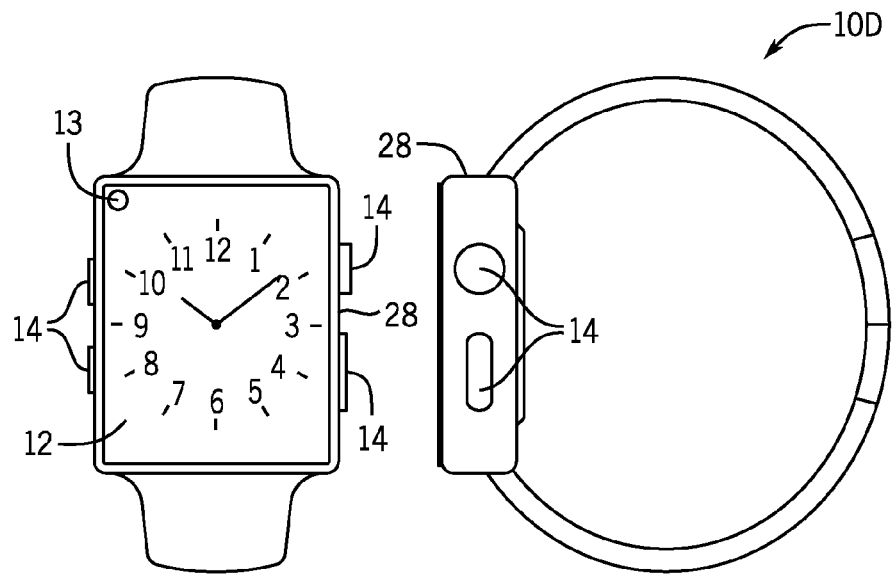
FIG. 5 is an example of the electronic device of FIG. 1, in accordance with an embodiment.

To further illustrate a suitable computing device 10, a tablet device 10B is described in FIG. 3. For example, the tablet device 10B may be any iPad® model available from Apple Inc. Additionally, in other embodiments, the computing device 10 may take the form of a computer 10C as described in FIG. 4. For example, the computer 10C may be any Macbook® or iMac® model available from Apple Inc. Furthermore, in other embodiments, the computing device 10 may take the form of a watch 10D as described in FIG. 5. For example, the watch 10D may be any Apple Watch® model available from Apple Inc. As depicted, the tablet device 10B, the computer 10C, and the watch 10D may each also include an electronic display 12, an image sensor 13, input structures 14, I/O ports 16, an enclosure 28, or any combination thereof.

As described above, source image data may be encoded (e.g., compressed) to reduce resource usage. Additionally, in some embodiments, the duration between generation of image data and display of image frames based on the image data may be limited to enable real-time or near real-time display and/or transmission of generated image frames. For example, image data captured by the image sensor 13 may be displayed on the electronic display 12 with minimal delay to enable a user to determine physical features proximate the image sensor 13 in real-time or near real-time. Additionally, image data generated by the computing device 10 (e.g., by the image sensor 13) may be transmitted (e.g., broadcast) to one or more other computing devices 10 to enable a real-time or near real-time streaming. To enable real-time or near real-time transmission and/or display, duration available to encode image data may be limited, particularly as resolution of image frames and/or refresh rates of electronic displays 12 increase.

Figure 6:
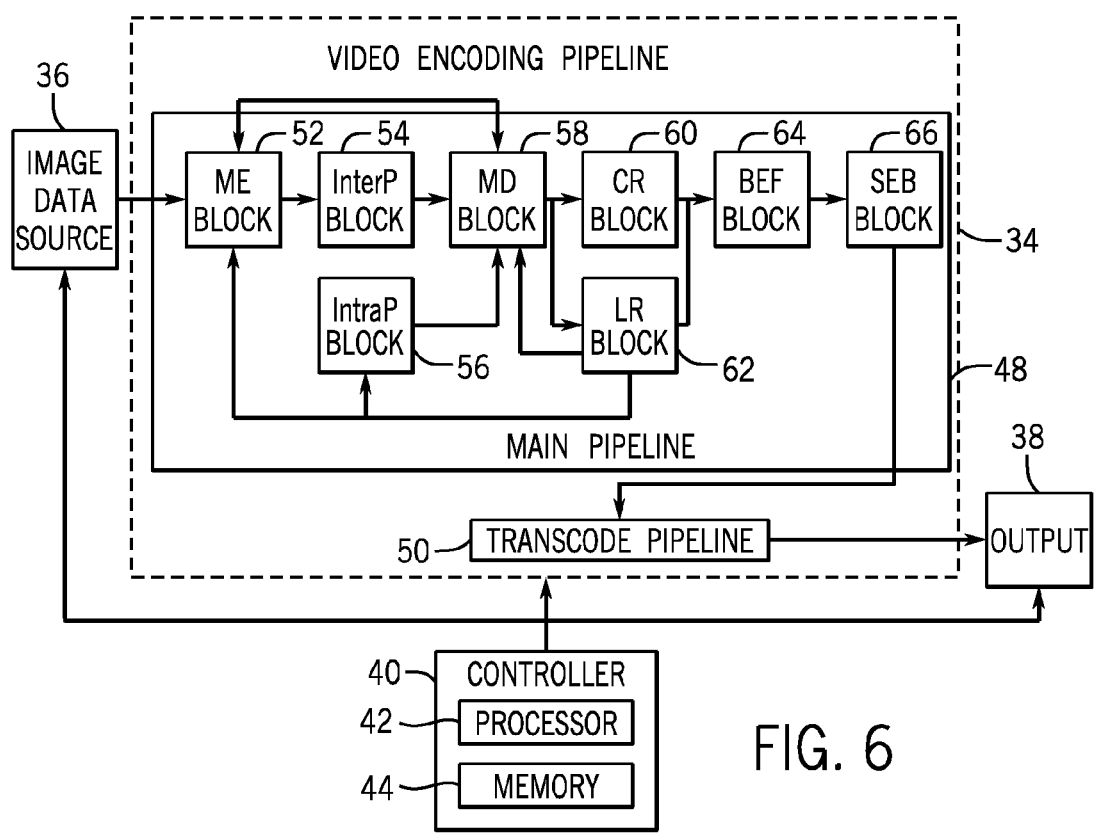
FIG. 6 is block diagram of a video encoding pipeline used to encode image data, in accordance with an embodiment.

One embodiment of a video encoding pipeline 34 that may be used to encode image data is described in FIG. 6. As depicted, the video encoding pipeline 34 is communicatively coupled to an image data source 36, an output 38, and a controller 40. In the depicted embodiment, the controller 40 may generally control operation of image data source 36, the video encoding pipeline 34, and the output 38. Although depicted as a single controller 40, in other embodiments, one or more separate controllers 40 may be used to control operation of the image data source 36, the video encoding pipeline 34, the output 38, or any combination thereof.

To facilitate generating encoded image data, the video encoding pipeline 34 may include multiple parallel pipelines. For example, in the depicted embodiment, the video encoding pipeline 34 includes a low resolution pipeline 46, a main pipeline 48, and a transcode pipeline 50. As will be described in more detail below, the main pipeline 48 may encode source image data using prediction techniques (e.g., inter-frame prediction techniques or intra-frame prediction techniques) and the transcode pipeline 50 may subsequently entropy encode syntax elements that indicate encoding operational parameters (e.g., quantization coefficient, inter-frame prediction mode, and/or intra-frame prediction mode) used to prediction encode the image data.

As depicted, the video encoding pipeline 34 is communicatively coupled to the image data source 36. In this manner, the video encoding pipeline 34 may receive source image data from the image data source 36. Thus, in some embodiments, the image data source 36 may be the image sensor 13 and/or any other suitable device that generates source image data.

Additionally, as depicted, the video encoding pipeline 34 is communicatively coupled to the output 38. In this manner, the video encoding pipeline 34 may output encoded (e.g., compressed) image data to the output 38, for example, for storage and/or transmission. Thus, in some embodiments, the output 38 may include the local memory 20, the main memory storage device 22, the network interface 24, the I/O ports 16, the controller memory 44, or any combination thereof.

To facilitate generating encoded image data, the video encoding pipeline 34 may include multiple parallel pipelines. For example, in the depicted embodiment, the video encoding pipeline 34 includes a main pipeline 48 and a transcode pipeline 50. In some embodiments, the video encoding pipeline 23 may additionally include a low resolution pipeline. As will be described in more detail below, the main pipeline 48 may encode source image data using prediction techniques (e.g., inter-frame prediction techniques or intra-frame prediction intra-frame prediction techniques) and the transcode pipeline 50 may subsequently entropy encode syntax elements that indicate encoding parameters (e.g., quantization coefficient, inter-frame prediction mode, and/or intra-frame prediction mode) used to prediction encode the image data.

To facilitate prediction encoding source image data, the main pipeline 48 may perform various functions. To simplify discussion, the functions are divided between various blocks (e.g., circuitry or modules) in the main pipeline 48.

In the depicted embodiment, the main pipeline 48 includes a motion estimation (ME) block 52, an inter-frame prediction (InterP) block 54, an intra-frame prediction (IntraP) block 56, a mode decision (MD) block 58, a chroma reconstruction (CR) block 60, a luma reconstruction (LR) block 62, a back-end-filter (BEF) block 64, and a syntax element binarization (SEB) block 66.

As depicted, the motion estimation block 52 is communicatively coupled to the image data source 36. In this manner, the motion estimation block 52 may receive source image data from the image data source 36, which may include a luma component (e.g., Y) and two chroma components (e.g., Cr and Cb). In some embodiments, the motion estimation block 52 may process one coding unit, including one luma coding block and two chroma coding blocks, at a time. As used herein a "luma coding block" is intended to describe the luma component of a coding unit and a "chroma coding block" is intended to describe a chroma component of a coding unit.

In some embodiments, the luma coding block may be the same resolution as the coding unit. On the other hand, the chroma coding blocks may vary in resolution based on chroma sampling format. For example, using a 4:4:4 sampling format, the chroma coding blocks may be the same resolution as the coding unit. However, the chroma coding blocks may be half (e.g., half resolution in the horizontal direction) the resolution of the coding unit when a 4:2:2 sampling format is used and a quarter the resolution (e.g., half resolution in the horizontal direction and half resolution in the vertical direction) of the coding unit when a 4:2:0 sampling format is used.

It should be appreciated that, while certain examples of particular coding units, prediction units, and transform units are described below, any suitable block sizes may be used. For example, while 16×16 or 32×32 coding units, prediction units, and transform units are discussed below, other sizes may be 64×64 or 128×128 or greater. Moreover, while the coding units, prediction units, and transform units are described as squares, other geometries may be used. For example, in other embodiments, the coding units, prediction units, and transform units may be 16×32 or 128×64.

As described above, a coding unit may include one or more prediction units, which may each be encoded using the same prediction technique, but different prediction modes. Each prediction unit may include one luma prediction block and two chroma prediction blocks. As used herein a "luma prediction block" is intended to describe the luma component of a prediction unit and a "chroma prediction block" is intended to describe a chroma component of a prediction unit. In some embodiments, the luma prediction block may be the same resolution as the prediction unit. On the other hand, similar to the chroma coding blocks, the chroma prediction blocks may vary in resolution based on chroma sampling format.

Based at least in part on the one or more luma prediction blocks, the motion estimation block 52 may determine candidate inter-frame prediction modes that can be used to encode a prediction unit. As described above, an inter-frame prediction mode may include a motion vector and a reference index to indicate location (e.g., spatial position and temporal position) of a reference sample relative to a prediction unit. More specifically, the reference index may indicate display order of a reference image frame corresponding with the reference sample relative to a current image frame corresponding with the prediction unit. Additionally, the motion vector may indicate position of the reference sample in the reference image frame relative to position of the prediction unit in the current image frame.

To determine a candidate inter-frame prediction mode, the motion estimation block 52 may search reconstructed luma image data, which may be received from the luma reconstruction block 62. For example, the motion estimation block 52 may determine a reference sample for a prediction unit by comparing its luma prediction block to the luma of reconstructed image data. In some embodiments, the motion estimation block 52 may determine how closely a prediction unit and a reference sample match based on a match metric. In some embodiments, the match metric may be the sum of absolute difference (SAD) between a luma prediction block of the prediction unit and luma of the reference sample. Additionally or alternatively, the match metric may be the sum of absolute transformed difference (SATD) between the luma prediction block and luma of the reference sample. When the match metric is above a match threshold, the motion estimation block 52 may determine that the reference sample and the prediction unit do not closely match. On the other hand, when the match metric is below the match threshold, the motion estimation block 52 may determine that the reference sample and the prediction unit are similar.

After a reference sample that sufficiently matches the prediction unit is determined, the motion estimation block 52 may determine location of the reference sample relative to the prediction unit. For example, the motion estimation block 52 may determine a reference index to indicate a reference image frame, which contains the reference sample, relative to a current image frame, which contains the prediction unit. Additionally, the motion estimation block 52 may determine a motion vector to indicate position of the reference sample in the reference frame relative to position of the prediction unit in the current frame. In some embodiments, the motion vector may be expressed as (mvX, mvY), where mvX is horizontal offset and mvY is a vertical offset between the prediction unit and the reference sample.

In this manner, the motion estimation block 52 may determine candidate inter-frame prediction modes (e.g., reference index and motion vector) for one or more prediction units in the coding unit. The motion estimation block 52 may then input candidate inter-frame prediction modes to the inter-frame prediction block 54. Based at least in part on the candidate inter-frame prediction modes, the inter-frame prediction block 54 may determine luma prediction samples.

In some embodiments, the inter-frame prediction block 54 may determine a luma prediction sample by applying motion compensation to a reference sample indicated by a candidate inter-frame prediction mode. For example, the inter-frame prediction block 54 may apply motion compensation by determining luma of the reference sample at fractional (e.g., quarter or half) pixel positions. The inter-frame prediction block 54 may then input the luma prediction sample and corresponding candidate inter-frame prediction mode to the mode decision block 58 for consideration. In some embodiments, the inter-frame prediction block 54 may sort the candidate inter-frame prediction modes based on associated mode cost and input only a specific number to the mode decision block 58.

The mode decision block 58 may also consider one or more candidate intra-frame predictions modes and corresponding luma prediction samples output by the intra-frame prediction block 56. The main pipeline 48 may be capable of using multiple (e.g., 17 or 35) different intra-frame prediction modes to generate luma prediction samples based on adjacent pixel image data. Thus, in some embodiments, the intra-frame prediction block 56 may determine a candidate intra-frame prediction mode and corresponding luma prediction sample for a prediction unit based at least in part on luma of reconstructed image data for adjacent (e.g., top, top right, left, or bottom left) pixels, which may be received from the luma reconstruction block 62.

For example, utilizing a vertical prediction mode, the intra-frame prediction block 56 may set each column of a luma prediction sample equal to reconstructed luma of a pixel directly above the column. Additionally, utilizing a DC prediction mode, the intra-frame prediction block 45 may set a luma prediction sample equal to an average of reconstructed luma of pixels adjacent the prediction sample. The intra-frame prediction block 56 may then input candidate intra-frame prediction modes and corresponding luma prediction samples to the mode decision block 58 for consideration. In some embodiments, the intra-frame prediction block 56 may sort the candidate intra-frame prediction modes based on associated mode cost and input only a specific number to the mode decision block 58.

The mode decision block 58 may determine encoding parameters used to encode the source image data (e.g., coding block). In some embodiments, the encoding parameters for a coding block may include prediction technique (e.g., intra-prediction techniques or inter-frame prediction techniques) for the coding block, number of prediction units in the coding block, size of the prediction units, prediction mode (e.g., intra-prediction modes or inter-frame prediction modes) for each of the prediction unit, number of transform units in the coding block, size of the transform units, whether to split the coding unit into smaller coding units, or any combination thereof.

To facilitate determining the encoding parameters, the mode decision block 58 may determine whether the image frame is an I-frame, a P-frame, or a B-frame. In I-frames, source image data is encoded only by referencing other image data used to display the same image frame. Accordingly, when the image frame is an I-frame, the mode decision block 58 may determine that each coding unit in the image frame may be prediction encoded using intra-frame prediction techniques.

On the other hand, in a P-frame or B-frame, source image data may be encoded by referencing image data used to display the same image frame and/or a different image frames. More specifically, in a P-frame, source image data may be encoding by referencing image data used to display a previous image frame. Additionally, in a B-frame, source image data may be encoded by referencing both image data used to display a previous image frame and image data used to display a subsequently image frame. Accordingly, when the image frame is a P-frame or a B-frame, the mode decision block 58 may determine each coding unit in the image frame may be prediction encoded using either intra-frame techniques or inter-frame techniques.

Although using the same prediction technique, the configuration of luma prediction blocks in a coding unit may vary. For example, the coding unit may include a variable number of luma prediction blocks at variable locations within the coding unit, which each uses a different prediction mode. As used herein, a "prediction mode configuration" is intended to describe a number, size, location, and prediction mode of luma prediction blocks in a coding unit. Thus, the mode decision block 58 may determine a candidate inter-frame prediction mode configuration using one or more of the candidate inter-frame prediction modes received from the inter-frame prediction block 54. Additionally, the mode decision block 58 may determine a candidate intra-frame prediction mode configuration using one or more of the candidate intra-frame prediction modes received from the intra-frame prediction block 56.

Since a coding block may utilize the same prediction technique, the mode decision block 58 may determine a prediction technique for a coding unit by comparing rate-distortion cost associated with the candidate prediction mode configurations and/or a skip mode. In some embodiments, the rate-distortion cost may be as follows:

$$RD = A(\text{rate\_cost}) + B(\text{distortion\_cost}) \quad (1)$$

where RD is the rate-distortion cost, rate_cost is an estimated rate expected to be used to indicate the source image data, distortion_cost is a distortion metric (e.g., sum of squared difference), A is a weighting factor for the estimated rate, and B is a weighting factor for the distortion metric.

The distortion metric may indicate amount of distortion in decoded image data expected to be caused by implementing a prediction mode configuration. Accordingly, in some embodiments, the distortion metric may be a sum of squared difference (SSD) between a luma coding block (e.g., source image data) and reconstructed luma image data received from the luma reconstruction block 62. As will be described in more detail below, reconstructed image data may be generated by subtracting a prediction sample from source image data to determine a prediction residual, performing a forward transform and quantization (FTQ) on the prediction residual, performing an inverse transform and quantization (ITQ) to determine a reconstructed prediction residual, and adding the reconstructed prediction residual to the prediction sample.

In some embodiments, the prediction residual of a coding unit may be transformed as one or more transform units. As used herein, a "transform unit" is intended to describe a sample within a coding unit that is transformed together. In some embodiments, a coding unit may include a single transform unit. In other embodiments, the coding unit may be divided into multiple transform units, which is each separately transformed.

Additionally, the estimated rate for an intra-frame prediction mode configuration may include expected number of bits used to indicate intra-frame prediction technique (e.g., coding unit overhead), expected number of bits used to indicate intra-frame prediction mode, expected number of bits used to indicate a prediction residual (e.g., source image data—prediction sample), and expected number of bits used to indicate a transform unit split. On the other hand, the estimated rate for an inter-frame prediction mode configuration may include expected number of bits used to indicate inter-frame prediction technique, expected number of bits used to indicate a motion vector (e.g., motion vector difference), and expected number of bits used to indicate a transform unit split. Additionally, the estimated rate of the skip mode may include number of bits expected to be used to indicate the coding unit when prediction encoding is skipped.

In embodiments where the rate-distortion cost of equation (1) is used, the mode decision block 58 may select prediction mode configuration or skip mode with the lowest associated rate-distortion cost for a coding unit. In this manner, the mode decision block 58 may determine encoding parameters for a coding block, which may include prediction technique (e.g., intra-prediction techniques or inter-frame prediction techniques) for the coding block, number of prediction units in the coding block, size of the prediction units, prediction mode (e.g., intra-prediction modes or inter-frame prediction modes) for each of the prediction units, number of transform units in the coding block, size of the transform units, whether to split the coding unit into smaller coding units, or any combination thereof.

To improve quality of decoded image data, the main pipeline 48 may then mirror decoding of encoded image data. To facilitate, the mode decision block 58 may output the encoding parameters and/or luma prediction samples to the chroma reconstruction block 60 and the luma reconstruction block 62. Based on the encoding parameters, the luma reconstruction block 62 and the chroma reconstruction block 60 may determine reconstructed image data.

More specifically, the luma reconstruction block 62 may generate the luma component of reconstructed image data. In some embodiments, the luma reconstruction block 62 may generate reconstructed luma image data by subtracting the luma prediction sample from luma of the source image data to determine a luma prediction residual. The luma reconstruction block 62 may then divide the luma prediction residuals into luma transform blocks as determined by the mode decision block 58, perform a forward transform and quantization on each of the luma transform blocks, and perform an inverse transform and quantization on each of the luma transform blocks to determine a reconstructed luma prediction residual. The luma reconstruction block 62 then add the reconstructed luma prediction residual to the luma prediction sample to determine reconstructed luma image data. As described above, the reconstructed luma image data may then be fed back for use in other blocks in the main pipeline 48. Additionally, the reconstructed luma image data may be output to the back-end-filter block 64.

On the other hand, the chroma reconstruction block 60 may generate both chroma components of reconstructed image data. In some embodiments, chroma reconstruction may be dependent on sampling format. For example, when luma and chroma are sampled at the same resolution (e.g., 4:4:4 sampling format), the chroma reconstruction block 60 may utilize the same encoding parameters as the luma reconstruction block 62. In such embodiments, for each chroma component, the chroma reconstruction block 60 may generate a chroma prediction sample by applying the prediction mode configuration determined by the mode decision block 58 to adjacent pixel image data.

The chroma reconstruction block 60 may then subtract the chroma prediction sample from chroma of the source image data to determine a chroma prediction residual. Additionally, the chroma reconstruction block 60 may divide the chroma prediction residual into chroma transform blocks as determined by the mode decision block 58, perform a forward transform and quantization on each of the chroma transform blocks, and perform an inverse transform and quantization on each of the chroma transform blocks to determine a reconstructed chroma prediction residual. The chroma reconstruction block may then add the reconstructed chroma prediction residual to the chroma prediction sample to determine reconstructed chroma image data, what may be input to the back-end-filter block 64.

However, in other embodiments, chroma sampling resolution may vary from luma sampling resolution, for example when a 4:2:2 or 4:2:0 sampling format is used. In such embodiments, encoding parameters determined by the mode decision block 58 may be scaled. For example, when the 4:2:2 sampling format is used, size of chroma prediction blocks may be scaled in half horizontally from the size of prediction units determined in the mode decision block 58. Additionally, when the 4:2:0 sampling format is used, the size of chroma prediction blocks may be scaled in half vertically and horizontally from the size of prediction units determined in the mode decision block 58. In a similar manner, a motion vector determined by the mode decision block 58 may be scaled for use with chroma prediction blocks.

To improve the quality of decode image data, the back-end-filter block 64 may then filter the reconstructed image data (e.g., reconstructed chroma image data and/or reconstructed luma image data). In some embodiments, the back-end-filter block 64 may perform deblocking and/or sample adaptive offset (SAO) functions. For example, the back-end-filter block 64 may perform deblocking on the reconstructed image data to reduce the perceivability of blocking artifacts that may be introduced. Additionally, the back-end-filter block 64 may perform a sample adapt offset function by adding offsets to portions of the reconstructed image data.

To enable decoding, encoding parameters used to generate encoded image data may be communicated to a decoding device. In some embodiments, the encoding parameters may include the encoding parameters determined by the mode decision block 58 (e.g., prediction unit configuration and/or transform unit configuration), encoding parameters used by the luma reconstruction block 62 and the chroma reconstruction block (e.g., quantization coefficients), and encoding parameters used by the back-end-filter block 64. To facilitate communication, the encoding parameters may be expressed as syntax elements. For example, a first syntax element may indicate a prediction mode (e.g., inter-frame prediction mode or intra-frame prediction mode), a second syntax element may indicate a quantization coefficient, a third syntax element may indicate configuration of prediction units, and a fourth syntax element may indicate configuration of transform units.

In some embodiments, resources used to communicate the encoding parameters may be reduced using entropy encoding, such as context adaptive binary arithmetic coding (CABAC) and/or context-adaptive variable-length coding (CAVLC). To facilitate, the syntax element binarization block 66 may receive encoding parameters expressed as syntax elements from the mode decision block 58, the luma reconstruction block 62, the chroma reconstruction block 60, and/or the back-end-filter block 64. The syntax element binarization block 66 may then binarize a syntax element by mapping the syntax element to a corresponding binary symbol, which includes one or more bins (e.g., "0" or "1"). In some embodiments, the syntax element binarization block 66 may generated the binary symbol using exp-golomb, fixed length, truncated unary, truncated rice, or any combination thereof. In this manner, the syntax element binarization block 66 may generate a bin stream, which is supplied to the transcode pipeline 50.

The transcode pipeline 50 may then convert the bin stream to a bit stream with one or more syntax elements represented by a fractional number of bits. In some embodiments, the transcode pipeline 50 may compress bins from the bin stream into bits using arithmetic coding. To facilitate arithmetic coding, the transcode pipeline 50 may determine a context model for a bin, which indicates probability of the bin being a "1" or "0," based on previous bins. Based on the probability of the bin, the transcode pipeline 50 may divide a range into two sub-ranges. The transcode pipeline 50 may then determine an encoded bit such that it falls within one of two sub-ranges to select the actual value of the bin. In this manner, multiple bins may be represented by a single bit, thereby improving encoding efficiency (e.g., reduction in size of source image data). After entropy encoding, the transcode pipeline 50, may transmit the encoded image data to the output 38 for transmission, storage, and/or display.

Dynamically Adjustable Motion Estimation Setup Configuration

As described above, the duration provided for encoding image data may be limited, particularly to enable real-time or near real-time display and/or transmission. Thus, to enable real-time or near real-time display and/or transmission, operational efficiency of the main pipeline 48, particularly the motion estimation block 52, may be improved. In some embodiments, operational efficiency of the motion estimation block may be improved by enabling adjustment in operating (e.g., searching) duration without significantly affecting transmission and/or display.

Figure 7:
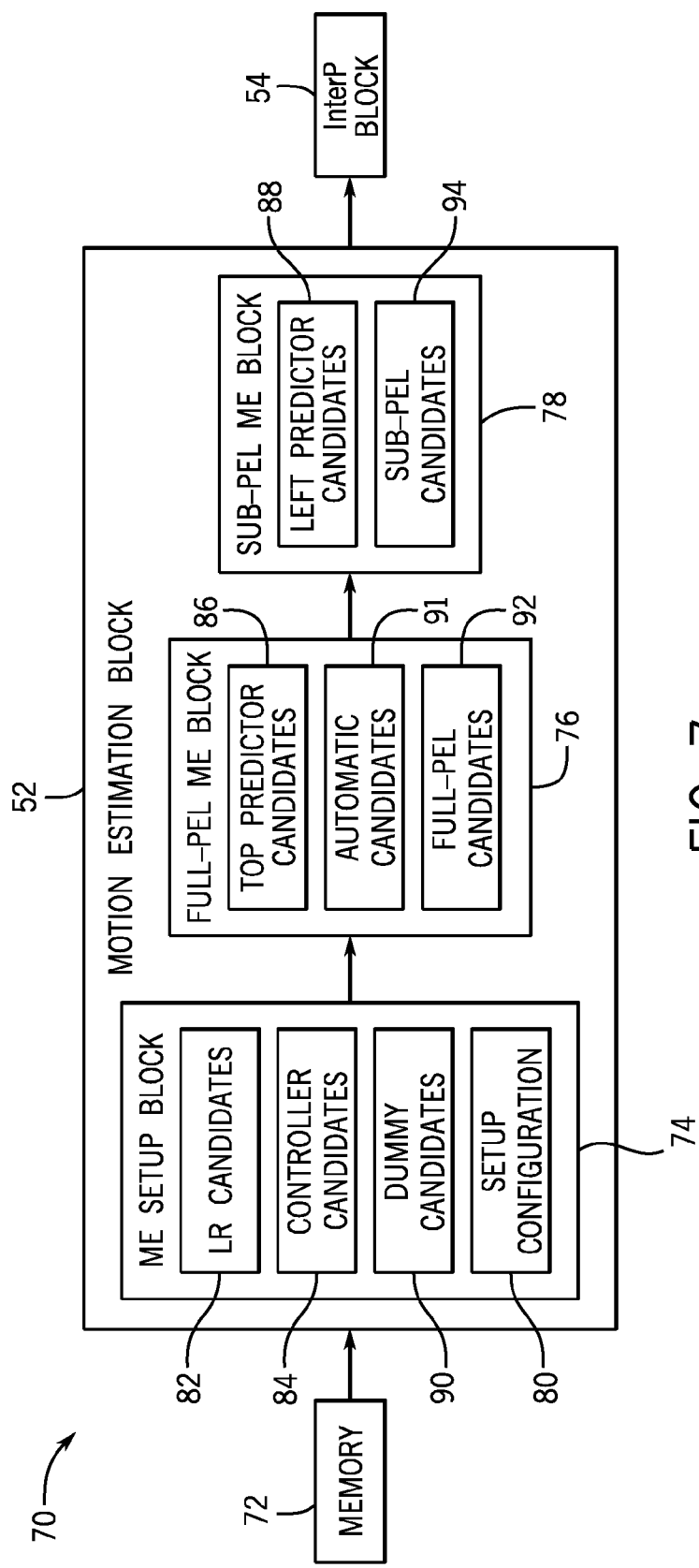
FIG. 7 is block diagram of a portion of the video encoding pipeline of FIG. 6 including a motion estimation block, in accordance with an embodiment.

To help illustrate, a portion 70 of the video encoding pipeline 34 including the motion estimation block 52, the inter-frame prediction block 54, and video encoding pipeline memory 72 is described in FIG. 7. With regard to the depicted embodiment, video encoding pipeline memory 72 is intended to represent a tangible, non-transitory, computer-readable medium that may be accessed by the video encoding pipeline 34 to store data and/or retrieve data, such as image data or statistics. Accordingly, in some embodiments, the video encoding pipeline memory 72 may be included in the controller memory 44, the local memory 20, or the main memory storage device 22. In other embodiments, the video encoding pipeline memory 72 may be a separate storage component dedicated to the video encoding pipeline 34.

As depicted, the video encoding pipeline memory 72 is communicatively coupled to the motion estimation block 52 in the main pipeline 48. In some embodiments, the video encoding pipeline memory 72 may provide direct memory access (DMA) that enables the main pipeline 48 to retrieve information from the video encoding pipeline memory 72 relatively independently. In such embodiments, the main pipeline 48 may retrieve source image data, for example, a coding unit from the video encoding pipeline memory 72. Additionally, in such embodiments, the main pipeline 48 may retrieve information used to determine initial candidate inter-frame prediction modes from the video encoding pipeline memory 72.

Based on the retrieved information, the motion estimation block 52 may determine initial candidate inter-frame prediction modes used to initialize the motion estimation block 52 and final candidate inter-frame prediction modes used by the inter-frame prediction block 54 to determine luma prediction samples. To facilitate, the motion estimation block 52 may include a motion estimation (ME) setup block 74, a full-pel motion estimation (ME) block 76, and a sub-pel motion estimation (ME) block 78. The term "full-pel" refers to full-pixel consideration while the term "sub-pel" refers to sub-pixel consideration. In other words, the full-pel motion estimation block 76 may determine reference samples at integer pixel locations and the sub-pel motion estimation block 78 may determine reference samples at fractional pixel locations.

In the depicted embodiment, the motion estimation setup block 74 may initialize the motion estimation block 52 by selecting initial candidate inter-frame prediction modes to use (e.g., evaluate) in the motion estimation block 52. As described above, initial candidate inter-frame prediction modes may be selected based at least in part on a setup configuration 80. In some embodiments, the setup configuration 80 may indicate setup parameters (e.g., number, type, and/or location) used by the motion estimation setup block 74 to select candidate inter-frame prediction modes evaluated by the full-pel motion estimation block 76 and/or the sub-pel motion estimation block 78. For example, based on the setup configuration 80, the motion estimation setup block 74 may select the initial candidate inter-frame prediction modes from one or more 16×16 low resolution inter-frame prediction modes 82, 32×32 low resolution inter-frame prediction modes 82, 16×16 controller inter-frame prediction modes 84, 32×32 controller inter-frame prediction modes 82, top predictor inter-frame prediction modes 84, left predictor inter-frame prediction modes 88, or any combination thereof. As will be described in more detail below, the motion estimation setup block 74 may retrieve the setup configuration 80 from the video encoding pipeline memory 72 based at least in part on operational parameters of the video encoding pipeline 34.

In some embodiments, a low resolution inter-frame prediction mode 82 may be determined by a low resolution motion estimation block (not depicted) and stored in the video encoding pipeline memory 72. More specifically, the low resolution motion estimation block may downscale image data, perform a motion estimation searching using the downscaled image data to determine a downscaled reference sample, and determining a low resolution inter-frame prediction mode 82 to indicate location of a reference sample corresponding with the downscaled reference sample. Additionally, the controller 40 may determine controller inter-frame prediction modes 84, for example, based on operation mode of the motion estimation block 52, and store the controller inter-frame prediction mode 84 in the video encoding pipeline memory 72. Accordingly, in some embodiments, the controller 40 may receive the low resolution inter-frame prediction modes 82 and/or the controller inter-frame prediction modes 84 from the video encoding pipeline memory 72 and input the low resolution inter-frame prediction modes 82 and/or the controller inter-frame prediction modes 84 to the full-pel motion estimation block 76.

Additionally, the predictor inter-frame prediction modes (e.g., top predictor inter-frame prediction modes 86, left inter-frame prediction modes 88, and/or co-located predictor inter-frame prediction modes) may be determined based at least in part on related inter-frame prediction modes (e.g., inter-frame prediction modes selected for other prediction units). For example, a top predictor inter-frame prediction mode 86 may be determined based on inter-frame prediction modes selected for pixels in a top adjacent prediction unit. Additionally, a left predictor inter-frame prediction mode 88 may be determined based on inter-frame prediction modes selected for pixels in a left adjacent prediction unit. Furthermore, a co-located prediction mode may be determine based on inter-frame prediction modes selected for a co-located prediction unit used to display another image frame However, in some embodiments, the related inter-frame prediction modes and, thus, the predictor inter-frame prediction modes, may not be directly available to the motion estimation setup block 74. For example, the related inter-frame prediction modes may not yet have been selected during execution of the motion estimation setup block 74. As such, the motion estimation setup block 74 may select dummy candidates 90 as place holders for predictor inter-frame prediction modes. The motion estimation setup block 74 may then input the selected initial candidate inter-frame prediction modes to the full-pel motion estimation block 76.

Based on the initial candidate inter-frame prediction modes, the full-pel motion estimation block 76 may perform motion estimation searches in a pixel area (e.g., +/−3 pixels) around locations indicated by the initial candidate inter-frame prediction modes. Thus, when dummy candidates 90 are input, the full-pel motion estimation block 76 may determine top predictor inter-frame prediction modes 86. As described above, the top predictor inter-frame prediction modes 86 may be determined based at least in part on related inter-frame prediction modes selected for pixels in a top adjacent prediction unit. In some embodiments, the full-pel motion estimation block 76 may receive the related inter-frame prediction modes from the mode decision block 58 and/or from the video encoding pipeline memory 72. As will be described in more detail below, the full-pel motion estimation block 76 may determine a top predictor inter-frame prediction mode 86 to define a pixel-search-area around a location indicated by a related inter-frame prediction mode.

In addition to the initial candidates received from the motion estimation setup block 74, the full-pel motion estimation block 76 may perform motion estimation searches based on automatic inter-frame prediction modes 91. In some embodiments, the automatic inter-frame prediction modes 91 are initial candidate inter-frame prediction modes used (e.g., evaluated) by the full-pel motion estimation block 76 regardless of other factors. As will be described in more detail below, the automatic inter-frame prediction modes 91 may be used to define a pixel-search-area around a location indicated by a zero vector (e.g., a co-located prediction unit).

In some embodiments, the full-pel motion estimation block 76 may search the pixel area to determine a reference sample at integer pixel locations. For example, the full-pel motion estimation block 76 may search the pixel area to determine a luma reference sample that is similar to a current luma prediction block. In some embodiments, the full-pel motion estimation block 76 may determine how close the match based on a match metric, such as a sum of absolute difference (SAD) between the luma prediction block and the luma reference sample. In some embodiments, the pixel area for each initial candidate inter-frame prediction mode searched by the full-pel motion estimation block 76 may be controlled by the setup configuration 80.

Once a sufficiently similar reference sample has been determined, the full-pel motion estimation block 76 may determine full-pel (e.g., intermediate) candidate inter-frame prediction 92 modes to identify location of the reference sample. In some embodiments, the full-pel candidate inter-frame prediction modes may include a motion vector and a reference index to indicate location of the reference sample relative to a current prediction unit.

Additionally, the full-pel motion estimation block 76 may determine estimated rate (e.g., number of bits) expected to be used to indicate the motion vector in the full-pel candidate inter-frame prediction modes 92. In some embodiments, an inter-frame prediction mode may be indicated as a motion vector difference (e.g., offset between the motion vector and a previously determined motion vector). As such, the estimated rate of a candidate inter-frame prediction mode may be determined based at least in on a related inter-frame prediction mode. For example, in some embodiments, the full-pel motion estimation block 76 may receive the related inter-frame prediction mode from the mode decision block 58 as feedback and/or retrieve the related inter-frame prediction mode from the video encoding pipeline memory 72. The full-pel motion estimation block 76 may then subtract the motion vector of the full-pel inter-frame prediction mode 92 from the motion vector of the related inter-frame prediction mode and determine estimated rate based on motion vector difference.

The full-pel motion estimation block 76 may then sort the full-pel candidate inter-frame prediction modes 92 by comparing associated motion vector cost. In some embodiments, the motion vector cost may be as follows:

$$\text{cost}_{MV} = C(\text{rate}_{MV}) + D(\text{match}) \tag{2}$$

where $\text{cost}_{MV}$ is the motion vector cost associated with a candidate inter-frame prediction mode, $\text{rate}_{MV}$ is estimated rate of the motion vector in the candidate inter-frame prediction mode, match is a match metric (e.g., sum of absolute difference) between a luma prediction block and a luma reference sample determined for the candidate inter-frame prediction mode, C is a weighting factor for the estimated rate of the motion vector, and D is a weighting factor for the match metric. In some embodiments, the full-pel motion estimation block 76 may provide one or more full-pel candidate inter-frame prediction modes 92 to the sub-pel motion estimation block 78 based on associated motion vector costs. Additionally, in some embodiments, the number and/or type of full-pel candidate inter-frame prediction modes 92 input to the sub-pel motion estimation block 78 may be controlled by the setup configuration 80.

The sub-pel motion estimation block 78 may then perform motion estimation searches in a sub-pixel area (e.g., +/−0.5 pixels) around locations identified by candidate inter-frame prediction modes. In some embodiments, the candidate inter-frame prediction modes used (e.g., evaluated) by the sub-pel motion estimation block 78 include the full-pel candidate inter-frame prediction modes 92. Additionally, when the motion estimation setup block 74 selects dummy candidates 90, the candidate inter-frame prediction modes may also include top predictor inter-frame prediction modes 86 and/or left predictor inter-frame prediction modes 88.

As described above, the left predictor inter-frame prediction modes 88 may be determined based at least in part on related inter-frame prediction modes selected for pixels in a left adjacent prediction unit. In some embodiments, the sub-pel motion estimation block 78 may receive the related inter-frame prediction modes from the mode decision block 58 as and/or from the video encoding pipeline memory 72. As will be described in more detail below, the sub-pel motion estimation block 76 may determine a left predictor inter-frame prediction mode 88 to define a pixel-search-area around a location indicated by the related inter-frame prediction mode.

In some embodiments, the sub-pel motion estimation block 78 may search the sub-pixel area to determine a reference sample at fractional pixel locations. For example, the sub-pel motion estimation block 78 may search the pixel area to determine a luma reference sample within the pixel-search-area that is similar to the current luma prediction block. In some embodiments, the sub-pel motion estimation block 78 may determine how close the match based on a match metric, such as a sum of absolute transformed difference (SATD) between the luma prediction block and the luma reference sample. In some embodiments, the pixel area search for each candidate inter-frame prediction mode searched by the sub-pel motion estimation block 78 may be controlled by the setup configuration 80.

Once a sufficiently similar reference sample has been determined, the sub-pel motion estimation block 78 may determine sub-pel (e.g., final) candidate inter-frame prediction 94 modes to identify location of the reference sample. In some embodiments, the sub-pel candidate inter-frame prediction modes 94 may include a motion vector and a reference index to indicate location of the reference sample relative to a current prediction unit.

Additionally, the sub-pel motion estimation block 78 may determine an estimated rate (e.g., number of bits) expected to be used to indicate the motion vector in the sub-pel candidate inter-frame prediction modes 94. Since inter-frame prediction modes may be indicated as a motion vector difference, the sub-pel motion estimation block 78 may determine the estimated rate based at least in part on related inter-frame prediction modes. For example, in some embodiments, the sub-pel motion estimation block 78 may receive the related inter-frame prediction mode from the mode decision block 58 as feedback and/or retrieve the related inter-frame prediction mode from the video encoding pipeline memory 72. The sub-pel motion estimation block 78 may then subtract the motion vector of the sub-pel inter-frame prediction mode 94 from the motion vector of the related inter-frame prediction mode and determine estimated rate based on motion vector difference.

Similar to the full-pel motion estimation block 76, the sub-pel motion estimation block 78 may also sort the candidate inter-frame prediction modes by comparing associated motion vector costs. As described above, in some embodiments, the motion vector cost of each candidate inter-frame prediction mode may be determined using equation (2). In some embodiments, the sub-pel motion estimation block 78 may then input one or more sub-pel (e.g., final) candidate inter-frame prediction modes 94 to the inter-frame prediction block 54 based at least in part on associated motion vector costs. Additionally, in some embodiments, the number and/or type of sub-pel candidate inter-frame prediction modes 94 input to the inter-frame prediction block 54 may be controlled by the setup configuration 80.

Thus, as described above, the setup configuration 80 may be determined to control operation of the motion estimation block 52. For example, the setup configuration 80 may control selection of initial candidate inter-frame prediction modes, selection of full-pel candidate inter-frame prediction modes 92, and/or selection of sub-pel candidate inter-frame prediction modes 94. Additionally, the setup configuration 80 may control motion estimation searching (e.g., search area) performed by the full-pel motion estimation block 76 and/or the sub-pel motion estimation block 78.

Figure 8:
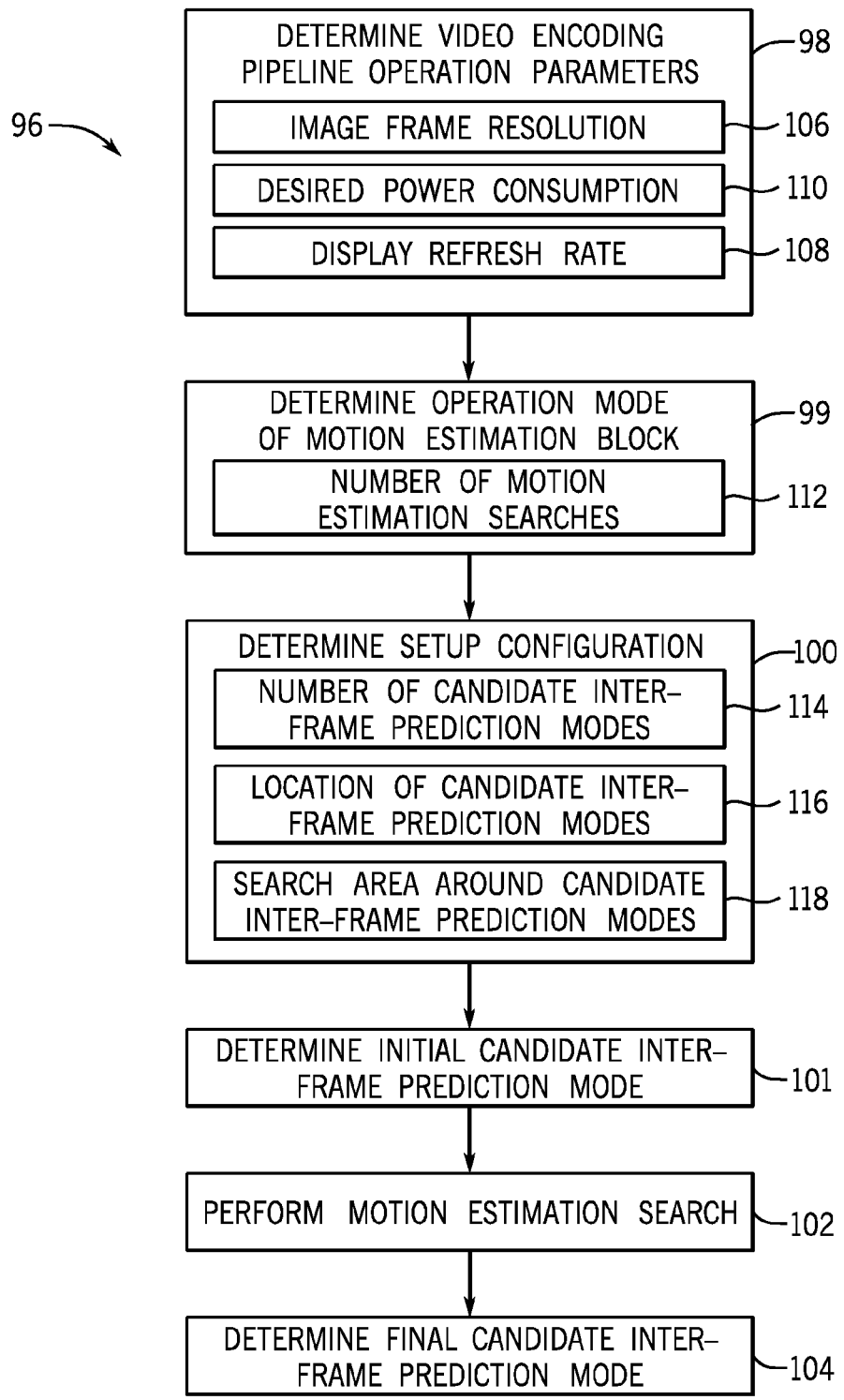
FIG. 8 is a flow diagram of a process for operating the motion estimation block of FIG. 7, in accordance with an embodiment.

To help illustrate, one embodiment of a process 96 for operating the motion estimation block 52 based on a setup configuration 80 is described in FIG. 8. Generally, the process 96 includes determining video encoding pipeline operational parameters (process block 98), determining operation mode of a motion estimation block (process block 99), determining setup configuration (process block 100), determining an initial candidate inter-frame prediction mode (process block 101), performing a motion estimation search (process block 102), and determining a final candidate inter-frame prediction mode (process block 104). In some embodiments, the process 96 may be implemented by executing instructions stored in a tangible, non-transitory, computer-readable medium, such as video encoding pipeline memory 72, controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may determine operational parameters of the video encoding pipeline 34 (process block 98). In some embodiments, the controller 40 may determine operational parameters of the video encoding pipeline 34 that affect desired operating duration of the motion estimation block 52, such as image frame resolution 106, display refresh rate 108, and/or desired power consumption 110. For example, as image frame resolution 106 and/or display refresh rate 108 increase, the desired operating duration of the motion estimation block 52 per coding unit may decrease due to the increase in amount of image data to be processed in a limited duration. Additionally, as desired power consumption 110 decreases, the desired operating duration of the motion estimation block 52 per coding unit may decrease to reduce amount of processing performed.

Thus, the controller 40 may determine the operational parameters of the video encoding pipeline 48 in various manners. In some embodiments, the controller 40 may analyze the source image data to determine the image frame resolution 106 and/or the display refresh rate 108. For example, the controller 40 may determine the image frame resolution 106 based at least on number of coding units in the source image data included in an image frame. Additionally, the controller 40 may determine the display refresh rate 108 based at least in part on frequency with which source image data is received. In other embodiments, the controller 40 may receive an indication of the image frame resolution 106, the display refresh rate 108, and/or desired power consumption 110 from the processor core complex 18 and/or a graphics processing unit.

Based at least in part on the operational parameters, the controller 40 may determine operation mode of the motion estimation block 52, which may indicate desired operating duration use to process each coding unit in the motion estimation block 52 (process block 99). In some embodiments, the desired operating duration may be indicated as number of motion estimation searches performed per coding unit (process block 112). For example, a first operation mode (e.g., normal mode) may indicate that the desired operating duration of the motion estimation block 52 is up to ninety-two 16×16 full-pel motion estimation searches per 32×32 coding unit. On the other hand, a second operation mode (e.g., turbo mode) may indicate that the desired operating duration of the motion estimation block is up to thirty-six 16×16 full-pel motion estimation searches per 32×32 coding unit.

In some embodiments, the operation mode may be a function of various operational parameters of the video encoding pipeline 34, such as image frame resolution 106, desired power consumption 110, display refresh rate 108, and the like. For example, in some embodiments, the operation mode of the motion estimation block 52 may be determined as follows:

$$OM = F(\text{Resolution}, \text{Power}, \text{Refresh}, \ldots) \quad (3)$$

where OM is the operation mode of the motion estimation block 52, F(.) is a function used to determine the operation mode, Resolution is the image frame resolution 106, Power is the desired power consumption 110, and Refresh is the display refresh rate 108.

In some embodiments, the controller 40 may weight the operational parameters of the video encoding pipeline 34 when determining the operation mode. In fact, in some embodiments, the controller 40 may dynamically adjust the weightings applied based on changes to the operational parameters of the video encoding pipeline 48. For example, when remaining battery level is above a threshold, the controller 40 may determine the operation mode with larger emphasis on the image frame resolution 106 and the display refresh rate 108 to improve quality of reference samples determined by the motion estimation block 52. However, when remaining battery level is below the threshold, the controller 40 may determine the operation mode with larger emphasis on desired power consumption 110 to facilitate extending battery life of the computing device 10.

Based at least in part on the operation mode, the controller 40 may determine a setup configuration 80 to implement in the motion estimation block 52 (process block 100). As described above, a setup configuration 80 may include operational parameters used to control operation of the motion estimation block 52. For example, the setup configuration 80 may include setup parameters used to select candidate inter-frame prediction modes evaluated by the full-pel motion estimation block 76 and/or the sub-pel motion estimation block 78. Thus, in some embodiments, the setup configuration 80 may indicate number of each type of candidate inter-frame prediction modes to select (process block 114), location of candidate inter-frame prediction modes to select (process block 116), and/or pixel-search-area around each candidate inter-frame prediction mode (process block 118).

In some embodiments, the one or more setup configurations 80 may be predetermined (e.g., by a manufacturer) and stored in the video encoding pipeline memory 72. For example, the video encoding pipeline memory 72 may store a relationship between one or more operation modes and corresponding setup configuration 80, for example, using a look-up-table. Thus, in such embodiments, the controller 40 may input an operation mode and receive a corresponding setup configuration from the video encoding pipeline memory 72. In this manner, as will be described in more detail below, the controller 40 may dynamically adjust the setup configuration 80 based at least in part on operational parameters of the video encoding pipeline 34 (e.g., operation mode of motion estimation block 52) to improve operational efficiency of the motion estimation block 52.

Additionally, the controller 40 may instruct the motion estimation block 52 to determine initial candidate inter-frame prediction modes (process block 101). As described above, the initial candidate inter-frame prediction modes may include automatic inter-frame prediction modes 91 that are automatically used in the full-pel motion estimation block 76. In addition to the automatic inter-frame prediction modes 91, the motion estimation block 52 may select initial candidate inter-frame prediction modes from variously sized low resolution inter-frame prediction modes 82, controller inter-frame prediction modes 84, top predictor inter-frame prediction modes 86, left predictor inter-frame prediction modes 88, co-located predictor inter-frame prediction modes, or any combination thereof. As described above, the motion estimation setup block 74 may select one or more initial candidate inter-frame prediction modes based at least in part on setup parameters included in the setup configuration, such as number of each type to select and/or location of initial candidate inter-frame prediction modes select.

To facilitate selection, the motion estimation setup block 74 may retrieve the low resolution inter-frame prediction modes 82 and/or controller candidate 84, for example, from the video encoding pipeline memory 72 via direct memory access. Based on the setup configuration 80, the motion estimation block 74 may select one or more low resolution inter-frame prediction modes 82 and/or one or more controller candidates 84 to input to the full-pel motion estimation block 76.

Additionally, in some embodiments, the motion estimation setup block 74 may input dummy candidates 90 to the full-pel motion estimation block 76 and/or the sub-pel motion estimation block 78 to select predictor inter-frame prediction mode. For example, when a dummy candidate 90 is received, the full-pel motion estimation block 76 may determine one or more top predictor inter-frame prediction modes 86 based at least in part on the inter-frame prediction modes selected for a top adjacent prediction unit. Additionally, when a dummy candidate 90 is received, the sub-pel motion estimation block 78 may determine one or more left predictor inter-frame prediction modes 88 based at least in part on the inter-frame prediction modes selected for a left adjacent prediction unit. Based at the least in part on the setup configuration 80, the full-pel motion estimation block 76 and the sub-pel motion estimation block 78 may respectively selected one or more top predictor inter-frame prediction modes 86 and one or more left predictor inter-frame prediction modes 88 as initial candidates.

The controller 40 may then instruct the motion estimation block 52 to perform one or more motion estimation searches based at least in part on the initial candidate inter-frame prediction modes (process block 102). More specifically, the motion estimation block 52 may perform a motion estimation search by searching pixel and/or sub-pixel areas around locations identified by the initial candidate inter-frame prediction modes to determine reference sample, which may be used to encode a current prediction unit. For example, the motion estimation block 52 may compare luma of samples of the pixel area to determine a reference a sample that is similar to a current luma prediction block. In some embodiments, controller 40 may instruct motion estimation block 52 to select the pixel area and/or the sub-pixel area searched based at least in part on the setup configuration 80.

In some embodiments, the motion estimation searches may be divided between full-pel motion estimation searches and sub-pel motion estimation searches. As described above, the full-pel motion estimation block 76 may perform a full-pel motion estimation search by searching a pixel area (e.g., +/−3 pixel) around a location indicated by an initial candidate inter-frame prediction mode to determine a reference sample at an integer pixel location. The full-pel motion estimation block 76 may determine then a full-pel (e.g., intermediate) candidate inter-frame prediction mode to indicate location of the reference sample determined by the full-pel motion estimation search. Specifically, the full-pel candidate inter-frame prediction 92 mode may indicate location of the reference sample relative to a current prediction unit. For example, the full-pel candidate inter-frame prediction mode 92 may include a reference index that indicates image frame the reference sample is located. Additionally, the full-pel candidate inter-frame prediction mode 92 may include a motion vector to indicate position of the reference sample in a reference image frame relative to position of the prediction unit in its image frame.

The sub-pel motion estimation block 78 may then perform a sub-pel motion estimation search by searching a sub-pixel area (e.g., +/−0.5 pixels) around a location indicated by a candidate inter-frame prediction mode to determine a reference sample at a fractional pixel location. In some embodiments, the candidate inter-frame prediction modes used (e.g., evaluated) by the sub-pel motion estimation block 78 include the full-pel candidate inter-frame prediction modes 92, top predictor inter-frame prediction modes 86, and/or left predictor inter-frame prediction modes 88. Additionally, in some embodiments the candidate inter-frame prediction modes used by the sub-pel motion estimation block 78 may be controlled based at least in part on the setup configuration 80.

The controller 40 may then instruct the motion estimation block 52 to determine one or more final candidate inter-frame prediction modes to indicate location of the one or more reference samples (process block 104). When utilizing both sub-pel and full-pel motion estimation searches, the sub-pel motion estimation block 78 may determine sub-pel (e.g., final) candidate inter-frame prediction modes 92. Specifically, the final candidate inter-frame prediction mode may indicate location of a reference sample relative to the current prediction unit. For example, the final candidate inter-frame prediction mode may include a reference index that indicates image frame a reference sample is located. Additionally, the final candidate inter-frame prediction mode may include a motion vector to indicate position of the reference sample in a reference image frame relative to position of the prediction unit in its image frame.

In this manner, the motion estimation block 52 may determine candidate inter-frame prediction modes to be evaluated by the mode decision block 58. As described above, the operation of the motion estimation block 52 to determine the candidate inter-frame prediction modes may be controlled based at least in part on a setup configuration 80. In some embodiments, the motion estimation block 52 may have multiple possible setup configuration 80, which include varying setup parameters. As such, operating the motion estimation block with different setup configurations 80 may result in varying operating (e.g., searching) duration, quality of reference samples, and/or power consumption.

In fact, in some embodiments, operational efficiency of the motion estimation block 52 may be improved by dynamically adjusting the setup configuration 80 based at least in part on operational parameters of the video encoding pipeline 72. To help illustrate, one embodiment of a look-up-table 120 used to determine setup configuration based on operation mode of the motion estimation block 52 is described in FIG. 9. In the depicted embodiment, the rows of the look-up-table 120 associate an operation mode with a corresponding a setup configuration 80, which includes number of each type of candidate inter-frame prediction modes to evaluate, location of candidate inter-frame prediction modes to evaluate, and pixel-search-area around each candidate inter-frame prediction mode.

For example, a first row 122 associates a normal mode with a first setup configuration 80. In the depicted embodiment, the first setup configuration 80 indicates that the initial candidate inter-frame prediction modes input to the full-pel motion estimation block 76 should include forty 16×16 initial candidate inter-frame prediction modes and seven 32×32 initial candidate inter-frame prediction modes. The first setup configuration 80 also indicates that the candidate inter-frame prediction modes input to the sub-pel motion estimation block 78 should include thirty-two 16×16 candidate inter-frame prediction modes and four 32×32 candidate inter-frame prediction modes. Additionally, the first setup configuration 80 indicates that initial candidate inter-frame prediction modes may be replaced based on a first replace (e.g., upper) threshold and moved based on a first move (e.g., lower) threshold. Furthermore, the first setup configuration 80 indicates that pixel-search-area for a candidate inter-frame prediction mode in the full-pel motion estimation block 76 is a first full-pel pixel-search-area (FSA1) and in the sub-pel motion estimation block 78 is a first sub-pel pixel-search-area (SSA1).

Similarly, a second row 124 associates a medium mode with a second setup configuration 80. In the depicted embodiment, the second setup configuration 80 indicates that the initial candidate inter-frame prediction modes input to the full-pel motion estimation block 76 should include sixteen 16×16 initial candidate inter-frame prediction modes and three 32×32 initial candidate inter-frame prediction modes. The second setup configuration 80 also indicates that the candidate inter-frame prediction modes input to the sub-pel motion estimation block 78 should include twenty 16×16 candidate inter-frame prediction modes and two 32×32 candidate inter-frame prediction modes. Additionally, the second setup configuration 80 indicates that initial candidate inter-frame prediction modes may be replaced based on a second replace (e.g., upper) threshold and moved based on a second move (e.g., lower) threshold. Furthermore, the second setup configuration 80 indicates that pixel-search-area for a candidate inter-frame prediction mode in the full-pel motion estimation block 76 is a second full-pel pixel-search-area (FSA2) and in the sub-pel motion estimation block 78 is a second sub-pel pixel-search-area (SSA2).

Additionally, a third row 126 associates a turbo mode with a third setup configuration 80. In the depicted embodiment, the third setup configuration 80 indicates that the initial candidate inter-frame prediction modes input to the full-pel motion estimation block 76 should include eight 16×16 initial candidate inter-frame prediction modes and one 32×32 initial candidate inter-frame prediction modes. The third setup configuration 80 also indicates that the candidate inter-frame prediction modes input to the sub-pel motion estimation block 78 should include twelve 16×16 candidate inter-frame prediction modes and two 32×32 candidate inter-frame prediction modes. Additionally, the third setup configuration 80 indicates that initial candidate inter-frame prediction modes may be replaced based on a third replace (e.g., upper) threshold and moved based on a third move (e.g., lower) threshold. Furthermore, the third setup configuration 80 indicates that pixel-search-area for a candidate inter-frame prediction mode in the full-pel motion estimation block 76 is a third full-pel pixel-search-area (FSA3) and in the sub-pel motion estimation block 78 is a third sub-pel pixel-search-area (SSA3).

Thus, using the look-up-table 120, the controller 40 may determine setup configuration 80 to implement based at least in part on operation mode of the motion estimation block 52. In fact, the controller 40 may dynamically adjust the setup configuration 80 implemented as operation mode of the motion estimation block 52 changes.

Figures 9, 10:
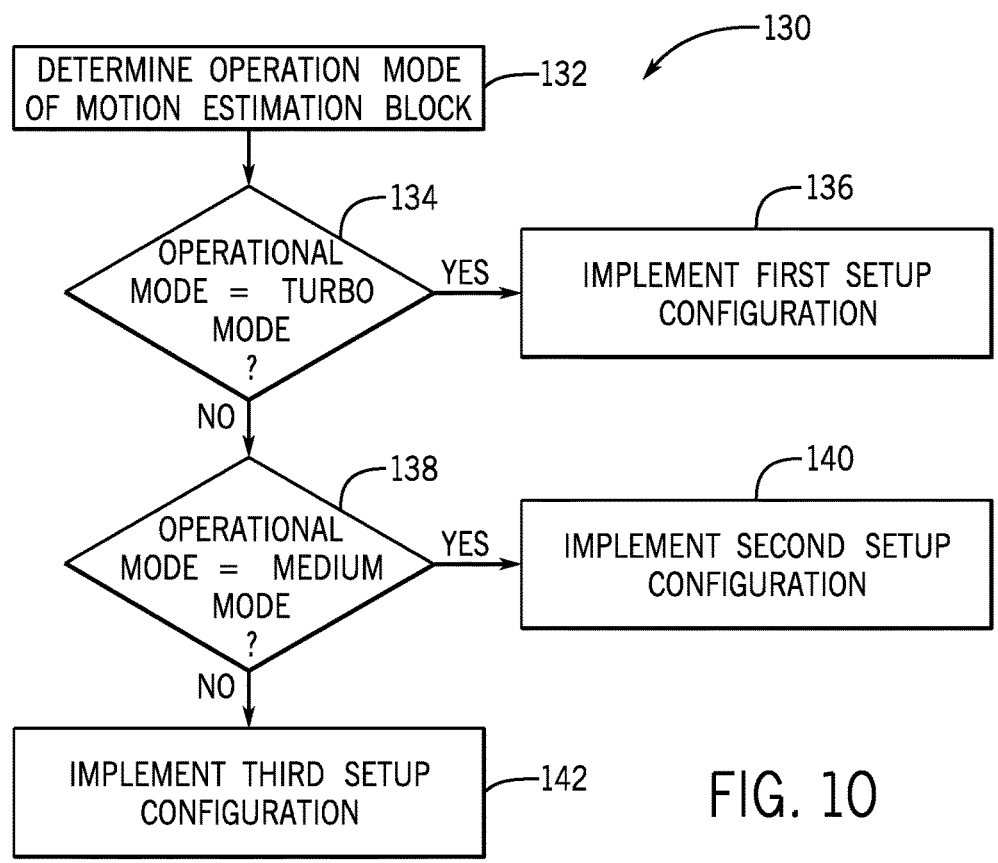
FIG. 9 is a diagrammatic representation of a loop-up-table used to determine setup configuration of the motion estimation block of FIG. 7, in accordance with an embodiment.
FIG. 10 is a flow diagram of a process for determining setup configuration of the motion estimation block of FIG. 7 based on operation mode, in accordance with an embodiment.

To help illustrate, one embodiment of a process 130 for dynamically adjusting the setup configuration 80 based on operation mode of a motion estimation block 52 is described in FIG. 10. Generally, the process 130 includes determining operation mode of motion estimation block (process block 132), determining whether the operation mode is equal to a normal mode (decision block 134), implementing a first setup configuration when the operation mode is equal to the normal mode (process block 136), determining whether the operation mode is equal to a medium mode when the operation mode is not equal to the normal mode (decision block 138), implementing a second setup configuration when the operation mode is equal to the medium mode (process block 140), and implement a third setup configuration when the operation mode is not equal to the medium mode (process block 142). In some embodiments, the process 130 may be implemented by executing instructions stored in a tangible, non-transitory, computer-readable medium, such as video encoding pipeline memory 72, controller memory 44, the local memory 20, the main memory storage device 22, or the like, using processing circuitry, such as the controller processor 42, the processor core complex 18, a graphics processing unit (GPU), or the like.

As described above, operation mode of the motion estimation block 52 may indicate desired operating duration of the motion estimation block 52. In the described embodiment, the operation modes include a normal mode, a medium mode, and a turbo mode, in which turbo mode has the shortest desired operating duration, normal mode has the longest desired operating duration, and medium mode has a desired operating duration between turbo mode and normal mode. For example, in a normal mode, the motion estimation block 52 may have a desired operating duration of up to ninety-two 16×16 full-pel motion estimation searches per 32×32 coding unit. Additionally, in a medium mode, the motion estimation block may have a desired operating duration of up to fifty-two 16×16 full-pel motion estimation searches per 32×32 coding unit. Furthermore, in a turbo mode, the motion estimation block 52 may have a desired operating duration of up to thirty-six 16×16 full-pel motion estimation searches per 32×32 coding unit.

In some embodiments, the controller 40 may determine the operation mode of the motion estimation block 52 (process block 132). As described above, the controller 40 may determine the operation mode of the motion estimation block 52 based at least in part on operational parameters of the video encoding pipeline 34, such as image frame resolution 106, display refresh rate 108, and desired power consumption 110. In some embodiments, operation mode may be a function of the various operational parameters of the video encoding pipeline 34, for example, as described in equation (3). In the described embodiment, the operation mode may be either a normal mode, a medium mode, or a turbo mode.

The controller 40 may then determine whether the operation mode is equal to a normal mode (decision block 134). Additionally, when the operation mode is equal to the normal mode, the controller 40 may determine and implement a first setup configuration 80 (process block 136). In some embodiments, the normal mode may be the default operation mode and, thus, indicate the default operating duration provided the motion estimation block 52. Thus, in such embodiments, the controller 40 may select the first setup configuration 80 by default.

As described above, the controller 40 may determine the first setup configuration 80 by inputting the normal mode to the look-up-table 120. The controller 40 may then instruct the motion estimation setup block 74 to select initial candidate inter-frame prediction modes based on the first setup configuration 80. Additionally, the controller 40 may instruct the full-pel motion estimation block 74 and/or the sub-pel motion estimation block 76 to perform motion estimation searches based at least in part on the first setup configuration 80.

When the operation mode does not equal the normal mode, the controller 40 may determine whether the operation mode is equal to a medium mode (decision block 138). Additionally, when the operation mode is equal to the medium mode, the controller 40 may determine and implement a second setup configuration 80 (process block 140). In some embodiments, the medium mode may reduce operating duration provided the motion estimation block 52 compared to the normal mode. Thus, in such embodiments, the second setup configuration 80 may facilitate reducing operating duration of the motion estimation block 52 by reducing the number of motion estimation searches performed.

Similar to the first setup configuration 80, the controller 40 may determine the second setup configuration 80 by inputting the medium mode to the look-up-table 120. The controller 40 may then instruct the motion estimation setup block 74 to select initial candidate inter-frame prediction modes based on the second setup configuration 80. Additionally, the controller 40 may instruct the full-pel motion estimation block 74 and/or the sub-pel motion estimation block 76 to perform motion estimation searches based at least in part on the second setup configuration 80.

When the operation mode does not equal the medium mode or the normal mode, the controller 40 may determine that the operation mode is equal to a turbo mode and determine a third setup configuration 80 (process block 132). In some embodiments, the turbo mode may further reduce operating duration provided the motion estimation block 52 compared to the medium mode. Thus, in such embodiments, the third setup configuration 80 may facilitate reducing operating duration of the motion estimation block 52 by further reducing the number of searches performed.

Similar to the first and second setup configurations 80, the controller 40 may determine the third setup configuration 80 by inputting the turbo mode to the look-up-table 120. The controller 40 may then instruct the motion estimation setup block 74 to select initial candidate inter-frame prediction modes based on the third setup configuration 80. Additionally, the controller 40 may instruct the full-pel motion estimation block 74 and/or the sub-pel motion estimation block 76 to perform motion estimation searches based at least in part on the third setup configuration 80.

In this manner, the controller 40 may dynamically adjust the setup configuration 80 based at least in part on the operation mode to facilitate achieving a desired operating duration. As such, operating duration may be dynamically adjusted based at least in part on operational parameters of the video encoding pipeline 34 to facilitate real-time or near real-time transmission and/or display of encode image data. In fact, in other embodiments, the controller 40 may dynamically adjust the setup configuration based directly on one or more operational parameters of the video encoding pipeline 34.

Figures 11, 12:
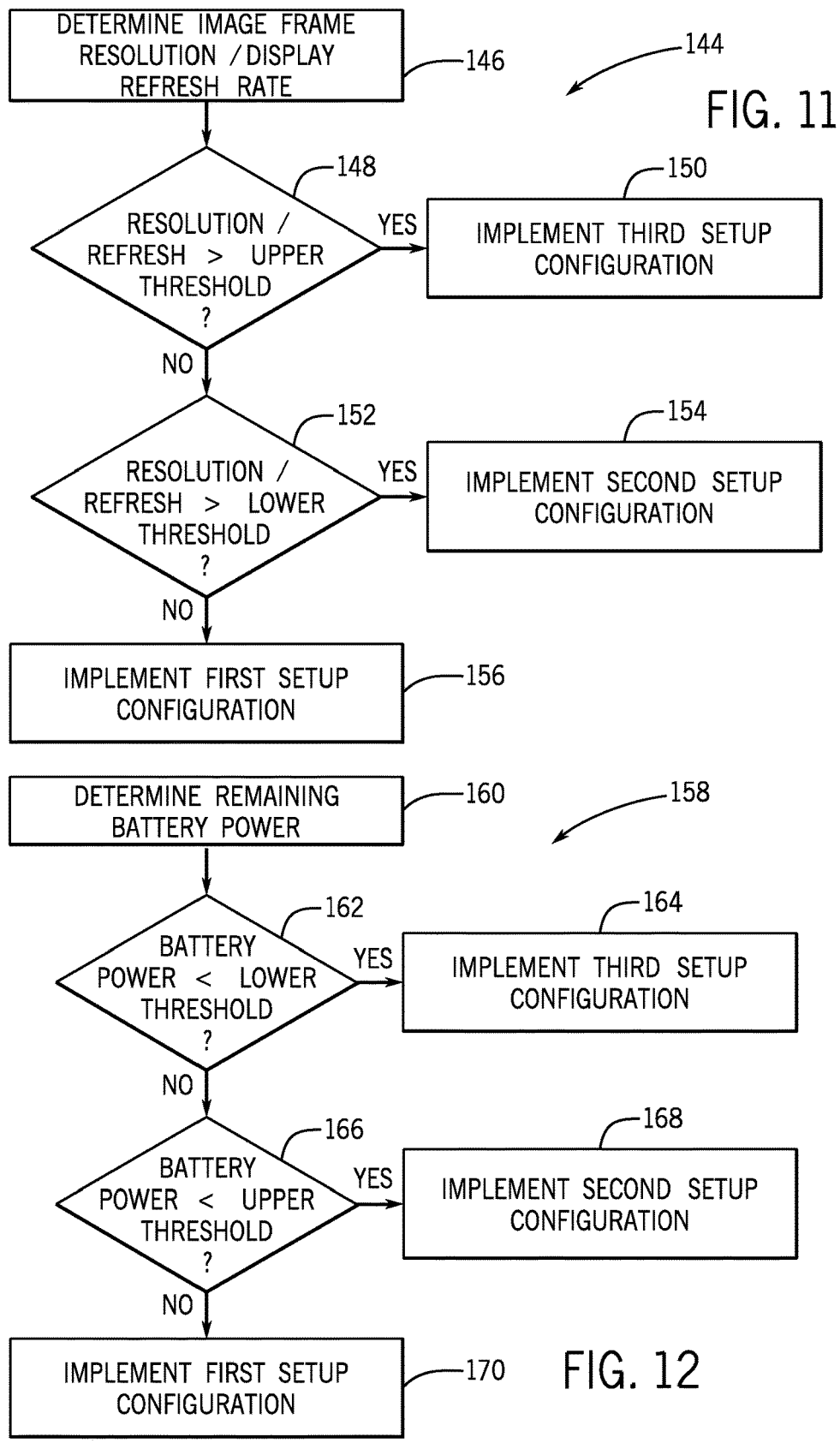
FIG. 11 is a flow diagram of a process for determining setup configuration of the motion estimation block of FIG. 7 based on image frame resolution and/or display refresh rate, in accordance with an embodiment.
FIG. 12 is a flow diagram of a process for determining setup configuration of the motion estimation block of FIG. 7 based desired power consumption, in accordance with an embodiment.

To help illustrate, one embodiment of a process 144 for dynamically adjusting the setup configuration 80 based on image frame resolution 106 is described in FIG. 11. Generally, the process 144 includes determining image frame resolution 106 and/or display refresh rate 108 (process block 146), determining whether the image frame resolution 106 and/or display refresh rate 108 is greater than an upper threshold (decision block 148), implementing the third setup configuration 80 when the image frame resolution 106 and/or display refresh rate 108 is greater than the upper threshold (process block 150), determining whether the image frame resolution 106 and/or display refresh rate 108 is greater than a lower threshold when the image frame resolution 106 and/or display refresh rate 108 is not greater than the upper threshold (decision block 152), implementing the second setup configuration 80 when the image frame resolution 106 and/or display refresh rate 108 is greater than the lower threshold (process block 154), and implementing the first setup configuration 80 when the image frame resolution 106 and/or display refresh rate 108 is not greater than the lower threshold (process block 156). In some embodiments, the process 144 may be implemented by executing instructions stored in a tangible, non-transitory, computer-readable medium, such as video encoding pipeline memory 72, controller memory 44, the local memory 20, the main memory storage device 22, or the like, using processing circuitry, such as the controller processor 42, the processor core complex 18, a graphics processing unit (GPU), or the like.

To further illustrate, one embodiment of a process 158 for dynamically adjusting the setup configuration 80 based on remaining battery power (e.g., desired power consumption 110) is described in FIG. 12. Generally, the process 158 includes determining remaining battery power (process block 160), determining whether the remaining battery power is less than a lower threshold (decision block 162), implementing the third setup configuration 80 when the remaining battery power is less than the lower threshold (process block 164), determining whether the remaining battery power is less than an upper threshold when the remaining battery power is not less than the lower threshold (decision block 166), implementing the second setup configuration when the remaining battery power is less than the upper threshold (process block 168), and implementing the first setup configuration when the remaining battery power is not less than the upper threshold (process block 170). In some embodiments, the process 158 may be implemented by executing instructions stored in a tangible, non-transitory, computer-readable medium, such as video encoding pipeline memory 72, controller memory 44, the local memory 20, the main memory storage device 22, or the like, using processing circuitry, such as the controller processor 42, the processor core complex 18, a graphics processing unit (GPU), or the like.

Predictor Inter-Frame Prediction Modes

As described above, the setup configuration 80 may be used to select initial candidate inter-frame prediction modes evaluated by the motion estimation block 52 based on type. In some embodiments, the motion estimation block may select initial candidate inter-frame prediction modes from variously sized low resolution inter-frame prediction modes 82, controller inter-frame prediction modes 84, top predictor inter-frame prediction modes 86, left predictor inter-frame prediction modes 88, and co-located inter-frame prediction modes. To facilitate adjusting (e.g., reducing) operating duration of the motion estimation block 52, the motion estimation block 52 may improve quality (e.g., likelihood that an initial candidate inter-frame prediction mode identifies a good reference sample) of the initial candidate inter-frame prediction modes selected.

Generally, a predictor inter-frame prediction mode may be determined based on an inter-frame prediction mode selected for a related (e.g., spatial or temporal) prediction unit or pixel block. Since an image frame may change gradually, inter-frame prediction mode selected for adjacent prediction units in the same image frame may be similar. Additionally, since successively displayed image frames may change gradually, inter-frame prediction mode selected for co-located prediction units may be similar. As such, quality may be improved by selecting one or more predictor inter-frame prediction modes (e.g., top predictor inter-frame prediction modes 86, left predictor inter-frame prediction modes 88, and/or co-located inter-frame prediction modes) as initial candidate inter-frame prediction modes.

Figure 13:
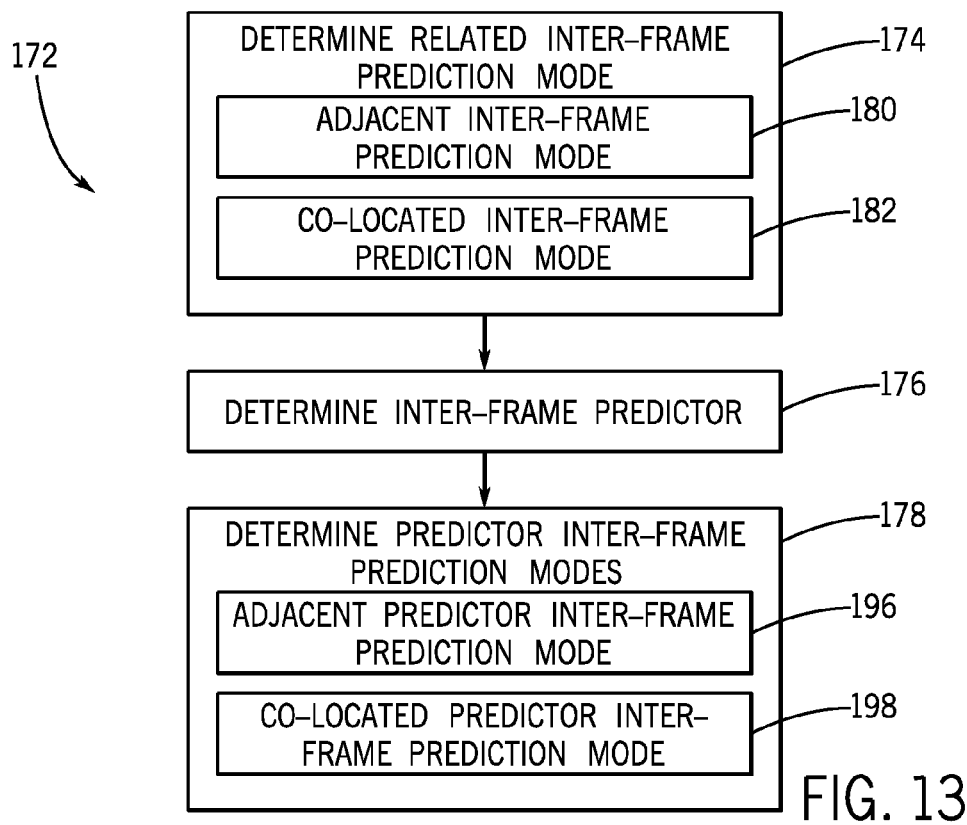
FIG. 13 is a flow diagram of a process for determining prediction inter-frame prediction modes evaluated in the motion estimation block of FIG. 7, in accordance with an embodiment.

To help illustrate, one embodiment of a process 172 for determining predictor inter-frame prediction modes is described in FIG. 13. Generally, the process 172 includes determining a related inter-frame prediction mode (process block 174), determining an inter-frame predictor (process block 176), and determining one or more predictor inter-frame prediction modes (process block 178). In some embodiments, the process 172 may be implemented by executing instructions stored in a tangible, non-transitory, computer-readable medium, such as video encoding pipeline memory 72, controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may instruct the motion estimation block 52 to determine inter-frame prediction modes selected for related prediction units (e.g., related inter-frame prediction modes) (process block 174). As described above, the inter-frame prediction mode for adjacent prediction units in the same image frame and/or co-located prediction units in different (e.g., successive) image frame may be similar. Accordingly, the controller 40 may determine inter-frame prediction modes related to a current prediction unit by determining adjacent inter-frame prediction modes (e.g., inter-frame prediction modes selected for an adjacent prediction unit) 180 and/or co-located inter-frame prediction modes 182 (e.g., inter-frame prediction modes select for a co-located prediction unit).

Additionally, the motion estimation block 52 may receive related inter-frame prediction modes as feedback from the mode decision block 58 and/or retrieve related inter-frame prediction modes from the video encoding pipeline memory 72. In some embodiments, source of the related inter-frame prediction modes may be dependent on when it was determined. For example, the related inter-frame prediction modes for odd rows may be fed back from the mode decision 58 since determined more recently. On the other hand, the related inter-frame prediction modes for even rows may be retrieved from the video encoding pipeline memory 72 via direct memory access since determine further in advance.

The controller 40 may then instruct the motion estimation block 52 to determine an inter-frame predictor (process block 176). In some embodiments, an inter-frame predictor may be the inter-frame prediction mode selected for a block of pixels adjacent a current coding unit. As such, the motion estimation block may determine the inter-frame predictor based at least in part on the related inter-frame prediction modes. In some embodiments, the related inter-frame prediction mode may be in sub-pel dimensions. As such, for use in the full-pel motion estimation block 76, the related inter-frame prediction mode may be quantized to full-pel dimensions to generate the inter-frame predictor. In some embodiments, the inter-frame predictor may be generated by right shifting the related inter-frame prediction mode two bits.

Figure 14:
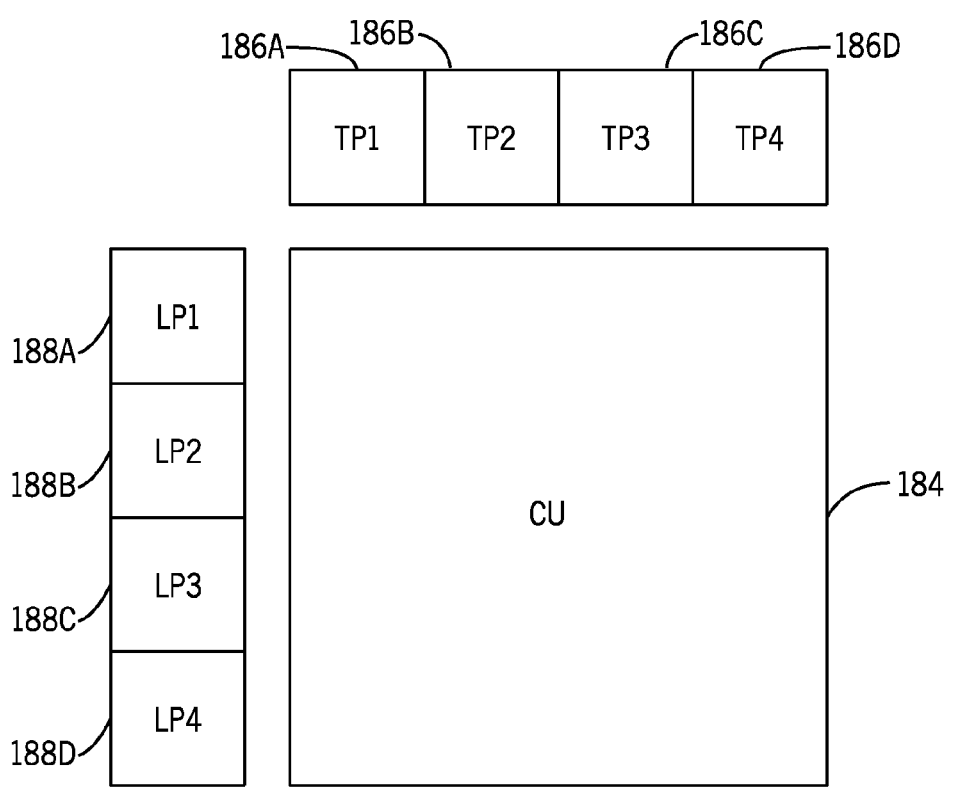
FIG. 14 is a diagrammatic representation top predictors and left predictors in relation to a coding unit, in accordance with an embodiment.

To help illustrate, a diagrammatic representation of a coding unit (CU) 184, top inter-frame predictors 186, and left inter-frame predictors 188 is described in FIG. 14. In the depicted embodiment, the coding unit 184 may utilize a first top inter-frame predictor (TP1) 186A, a second top inter-frame predictor (TP2) 186B, a third top inter-frame predictor (TP3) 186C, and a fourth top inter-frame predictor (TP4) 186D. Additionally, the coding unit 184 may utilize a first left inter-frame predictor (LP1) 188A, a second left inter-frame predictor (LP2) 188B, a third left inter-frame predictor (LP3) 188C, and a fourth left inter-frame predictor (LP4) 188D.

For illustrative purposes, the coding unit 184 is a 32×32 coding unit. As such, each top inter-frame predictor 186 may be the inter-frame prediction mode selected for the corresponding 8×8 pixel block top adjacent the coding unit 184. Additionally, each left predictor 188 may be the inter-frame prediction mode selected for a corresponding 8×8 pixel block left adjacent the coding unit 184. Thus, each top predictor 186 and left predictor 188 may be the inter-frame prediction mode selected for a prediction unit that encompasses it. When an inter-frame prediction mode is not selected for the prediction unit that encompasses it, the top predictor 186 or the left predictor 188 may be set equal to zero.

As described above, a coding unit may include various possible configurations of prediction units. For example, the coding unit 184 may include a single 32×32 prediction unit, four 16×16 prediction units, or sixteen 8×8 prediction units. As such, the motion estimation block 52 may determine candidate inter-frame prediction modes for each of the possible prediction unit configurations. To facilitate, the motion estimation block 52 may use one or more predictor inter-frame prediction modes as initial candidates.

Figure 15C:
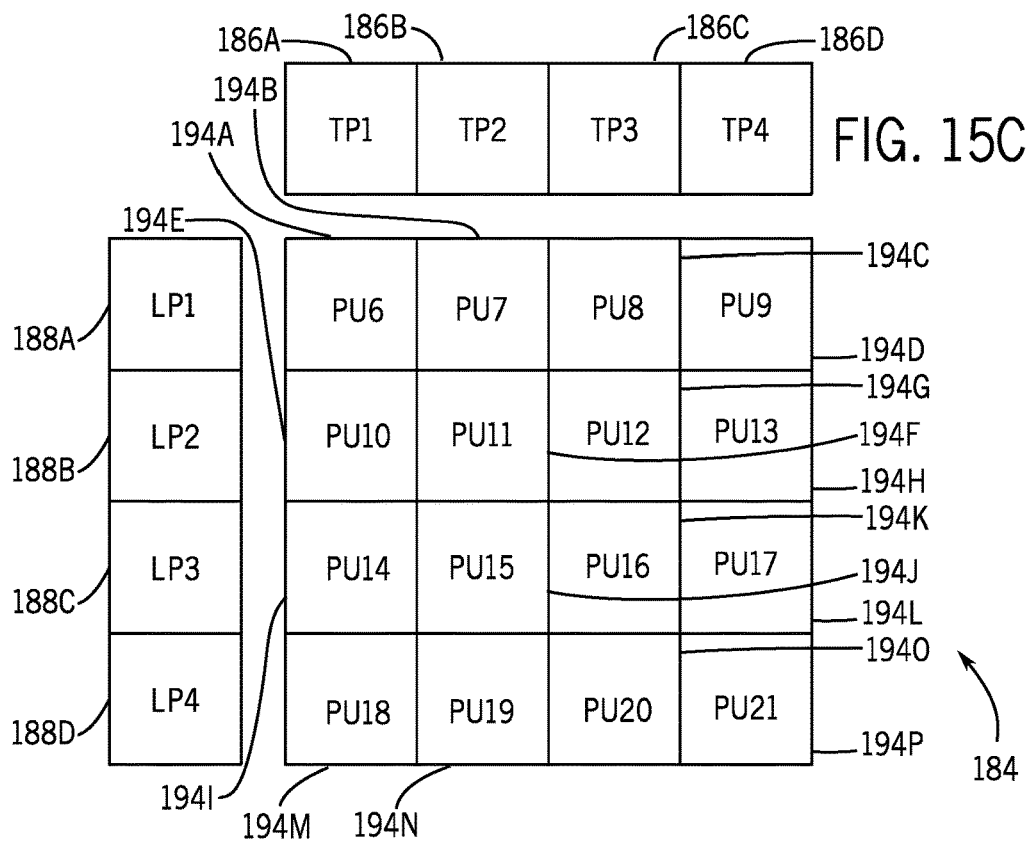

To help illustrate, diagrammatic representations of the coding unit 184 in various prediction unit configurations are described in FIGS. 15A-C. Specifically, FIG. 15A describes a prediction unit configuration in which the coding unit 184 includes a single 32×32 prediction (PU1) 190. The inter-frame predictor used for a prediction unit may be based on position (e.g., row or column) of its top left corner. Thus, in this prediction unit configuration, the motion estimation block 52 may determine a top predictor inter-frame prediction mode 86 for the 32×32 prediction unit 190 based at least in part on the first top inter-frame predictor 186A. Additionally, the motion estimation block 52 may determine a left predictor inter-frame prediction mode 88 for the 32×32 prediction unit 190 based at least in part on the first top left-frame predictor 188A.

Additionally, FIG. 15B describes a prediction unit configuration in which the coding unit 184 includes a first 16×16 prediction unit (PU2) 192A, a second 16×16 prediction unit (PU3) 192B, a third 16×16 prediction unit (PU4) 192C, and a fourth 16×16 prediction unit (PU5) 192D. In this prediction unit configuration, the motion estimation block 52 may determine top predictor inter-frame prediction modes 86 for the first 16×16 prediction unit 192A and the third 16×16 prediction unit 192C based at least in part on the first top inter-frame predictor 186A. The motion estimation block 52 may also determine top predictor inter-frame prediction modes 86 for the second 16×16 prediction unit 192B and the fourth 16×16 prediction unit 192D based at least in part on the third top inter-frame predictor 186C. Additionally, the motion estimation block 52 may determine left predictor inter-frame prediction modes 88 for the first 16×16 prediction unit 192A and the second 16×16 prediction unit 192B based at least in part on the first left inter-frame predictor 188A. The motion estimation block 52 may also determine left predictor inter-frame prediction modes 88 for the third 16×16 prediction unit 192C and the fourth 16×16 prediction unit 192D based at least in part on the third left inter-frame predictor 188C.

Furthermore, FIG. 15C describes a prediction unit configuration in which the coding unit 184 includes a first 8×8 prediction unit (PU6) 194A, a second 8×8 prediction unit (PU7) 194B, a third 8×8 prediction unit (PU8) 194C, and a fourth 8×8 prediction unit (PU9) 194D. Additionally, the coding unit 184 includes a fifth 8×8 prediction unit (PU10) 194E, a sixth 8×8 prediction unit (PU11) 194F, a seventh 8×8 prediction unit (PU12) 194G, and an eighth 8×8 prediction unit (PU13) 194H. The coding unit 184 also includes a ninth 8×8 prediction unit (PU14) 194I, a tenth 8×8 prediction unit (PU15) 194J, an eleventh 8×8 prediction unit (PU16) 194K, and a twelfth 8×8 prediction unit (PU17) 194L. Furthermore, the coding unit includes a thirteenth 8×8 prediction unit (PU18) 194M, a fourteenth 8×8 prediction unit (PU19) 194N, a fifteenth 8×8 prediction unit (PU20) 194O, and a sixteenth 8×8 prediction unit (PU21) 194P.

In this prediction unit configuration, the motion estimation block 52 may determine top predictor inter-frame prediction modes 86 for the first 8×8 prediction unit 194A, the fifth 8×8 prediction unit 194E, the ninth 8×8 prediction unit 194I, and the thirteenth 8×8 prediction unit 194M based at least in part on the first top inter-frame predictor 186A. Additionally, the motion estimation block 52 may determine top predictor inter-frame prediction modes 86 for the second 8×8 prediction unit 194B, the sixth 8×8 prediction unit 194F, the tenth 8×8 prediction unit 194J, and the fourteenth 8×8 prediction unit 194N based at least in part on the second top inter-frame predictor 186B. The motion estimation block 52 may also determine top predictor inter-frame prediction modes 86 for the third 8×8 prediction unit 194C, the seventh 8×8 prediction unit 194G, the eleventh 8×8 prediction unit 194K, and the fifteenth 8×8 prediction unit 194O based at least in part on the third top inter-frame predictor 186C. Furthermore, the motion estimation block 52 may also determine top predictor inter-frame prediction modes 86 for the fourth 8×8 prediction unit 194D, the eighth 8×8 prediction unit 194H, the twelfth 8×8 prediction unit 194L, and the sixteenth 8×8 prediction unit 194P based at least in part on the fourth top inter-frame predictor 186D.

Additionally, in this prediction unit configuration, the motion estimation block 52 may determine left predictor inter-frame prediction modes 88 for the first 8×8 prediction unit 194A, the second 8×8 prediction unit 194B, the third 8×8 prediction unit 194C, and the fourth 8×8 prediction unit 194D based at least in part on the first left inter-frame predictor 188A. Additionally, the motion estimation block 52 may determine left predictor inter-frame prediction modes 88 for the fifth 8×8 prediction unit 194E, the sixth 8×8 prediction unit 194F, the seventh 8×8 prediction unit 194G, and the eighth 8×8 prediction unit 194H based at least in part on the second left inter-frame predictor 188B. The motion estimation block 52 may also determine left predictor inter-frame prediction modes 88 for the ninth 8×8 prediction unit 194I, the tenth 8×8 prediction unit 194J, the eleventh 8×8 prediction unit 194K, and the twelfth 8×8 prediction unit 194L based at least in part on the third left inter-frame predictor 188C. Furthermore, the motion estimation block 52 may also determine left predictor inter-frame prediction modes 88 for the thirteenth 8×8 prediction unit 194M, the fourteenth 8×8 prediction unit 194N, the fifteenth 8×8 prediction unit 194O, and the sixteenth 8×8 prediction unit 194P based at least in part on the fourth left inter-frame predictor 188D.

Returning to the process 172 described in FIG. 13, the controller 40 may then instruct the motion estimation block 52 to determine one or more predictor inter-frame prediction modes (process block 178). In some embodiments, the motion estimation block 52 may determine co-located predictor inter-frame prediction modes 196 based on inter-frame predictors corresponding with the co-located predictor inter-frame prediction modes 182. Additionally, the motion estimation block 52 may determine adjacent predictor inter-frame prediction modes 188 based on inter-frame predictors correspond with the adjacent predictor inter-frame prediction modes 180. More specifically, the motion estimation block may determine adjacent predictor inter-frame prediction modes 180 based at least in part on top inter-frame predictors 186 and/or left inter-frame predictors 188.

Figure 16:
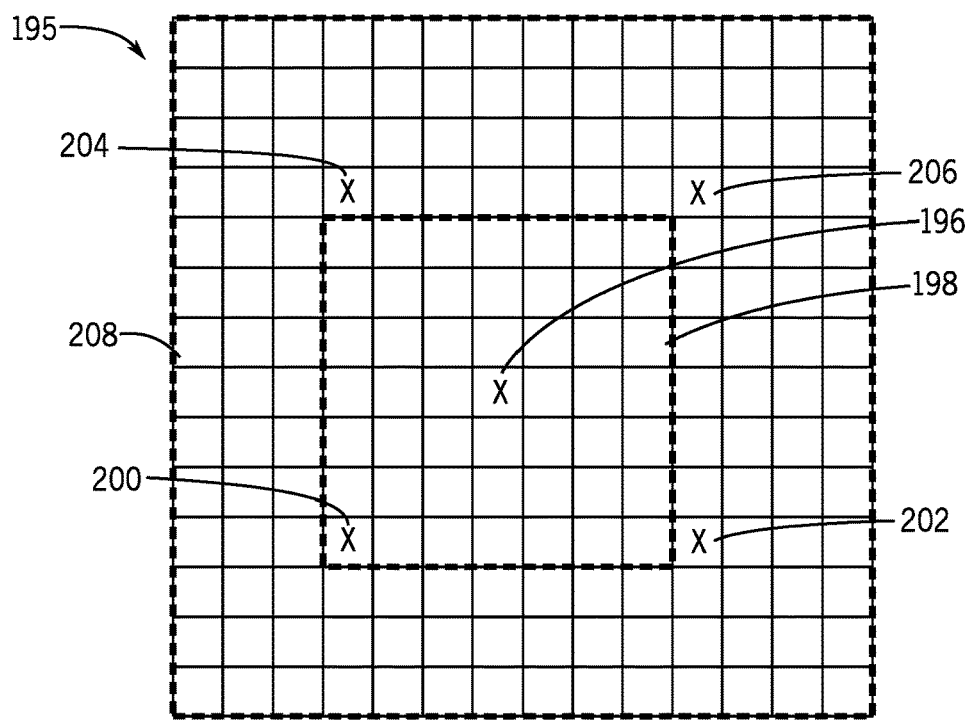
FIG. 16 is a diagrammatic representation of pixel-search-areas in a reference image frame resulting from various predictor inter-frame prediction modes, in accordance with an embodiment.

To help illustrate, a diagrammatic representation of a portion of a reference image frame 195 is described in FIG. 16. In the depicted embodiment, the reference image frame 195 includes a pixel 196 identified by a first adjacent inter-frame predictor. In some embodiments, the motion estimation block 52 may use the inter-frame predictor as a predictor inter-frame prediction mode (e.g., initial candidate inter-frame perdition mode). As described above, the motion estimation block 52 may perform a motion estimation search on a by searching a pixel area around a location indicated by a candidate inter-frame prediction mode to determine a reference sample similar to a current prediction unit. Accordingly, when inter-frame predictor is used as an initial inter-frame prediction candidate and a +/−3 pixel area used, the full-pel motion estimation block 76 may perform a motion estimation search in a 7×7 pixel area 198 centered around the pixel 196.

However, in other embodiments, the motion estimation block 52 may determine predictor inter-frame prediction modes to by applying offsets to the inter-frame predictor. For example, the motion estimation block 52 determine a first predictor inter-frame prediction mode 200 by applying a −3 horizontal offset and a −3 vertical offset to the pixel 196. The motion estimation block 52 may also determine a second predictor inter-frame prediction mode 202 by applying a −3 horizontal offset and a +4 vertical offset to the pixel 194. Additionally, the motion estimation block 52 may determine a third predictor inter-frame prediction mode 204 by applying a +4 horizontal offset and a −3 vertical offset to the pixel 194. The motion estimation block 52 may also determine a fourth predictor inter-frame prediction mode 206 by applying a +4 horizontal offset and a +4 vertical offset to the pixel 194.

Thus, when the +/−3 pixel area used, the full-pel motion estimation block 76 may perform a motion estimation search in a 14×14 pixel area 208 centered around the pixel 194. In this manner, the motion estimation block 52 may determine the predictor inter-frame prediction modes to expand pixel-search-area around location indicated by an inter-frame predictor. As such, selecting prediction inter-frame prediction modes may improve quality of the initial candidate inter-frame prediction modes, which may facilitate reducing search duration and, thus, real-time or near real-time transmission and/or display of encode image data.

Dynamic Inter-Frame Prediction Mode Adjustment

As described above, the full-pel motion estimation search may perform motion estimation searches based on initial candidate inter-frame prediction modes. In some embodiments, the initial candidate inter-frame prediction modes may include initial candidates selected by the motion estimation setup block 74 based on a setup configuration 80. Additionally, the initial candidate inter-frame prediction modes may include automatic inter-frame prediction modes 91.

In operation, the full-pel motion estimation block 76 may search a pixel area (e.g., +/−3 pixels) around a location indicated by an initial candidate inter-frame prediction mode to determine a reference sample for a current prediction unit. As such, in some instances, the pixel area searched for multiple initial inter-frame prediction modes may overlap. However, overlaps in pixel search area may result in reducing total area searched by the full-pel motion estimation block 76 and, thus, decrease likelihood of determining a reference sample that closely matches the current prediction unit.

As described above, to facilitate reducing operating duration of the motion estimation block 52, the quality of initial candidate inter-frame prediction modes evaluated by the full-pel motion estimation block 76 may be improved. In some embodiments, the quality may be improved by selecting initial candidate inter-frame prediction modes that reduce amount of overlapped pixel-search-area. In other words, the motion estimation setup block 74 may select initial candidate inter-frame prediction modes based at least in part on location indicated and/or resulting pixel-search-area.

Figure 17:
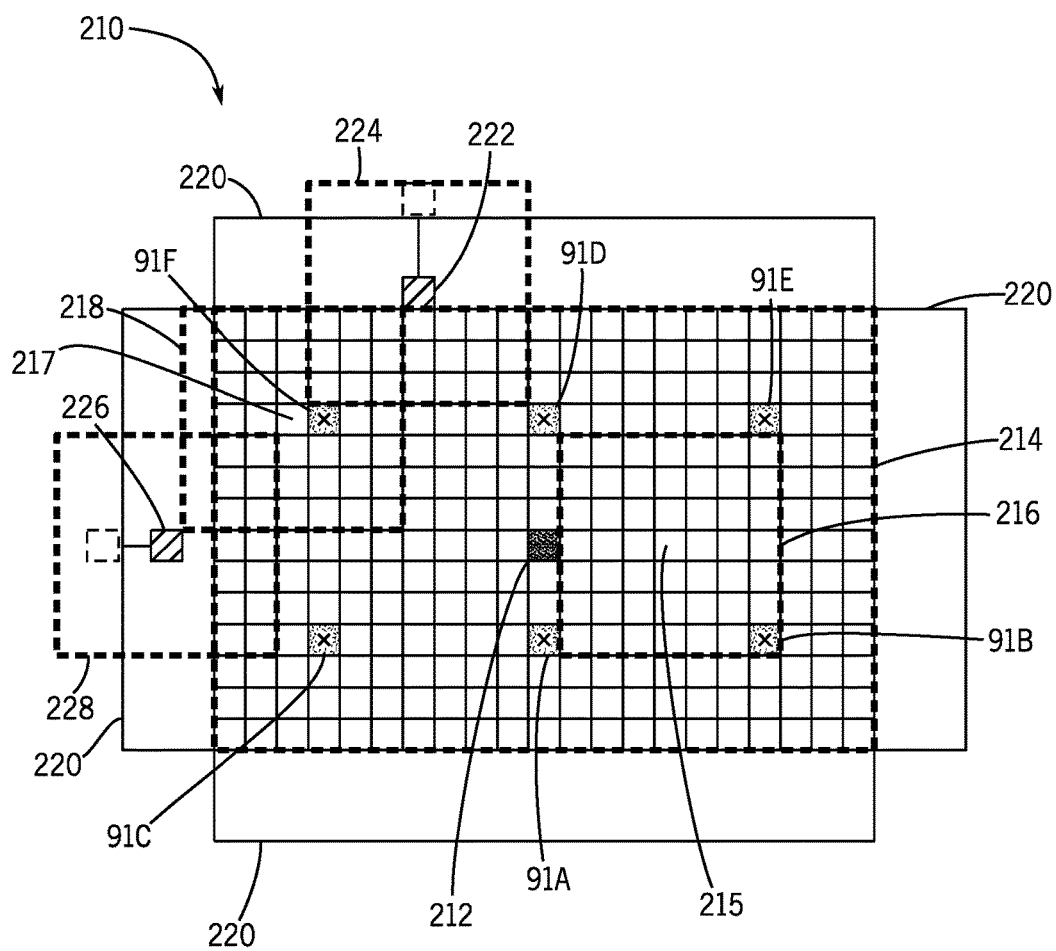
FIG. 17 is a diagrammatic representation of pixel-search-areas in a reference image frame resulting from various candidate inter-frame prediction modes, in accordance with an embodiment.

To help illustrate, a diagrammatic representation of a portion of a reference image frame 210 is described in FIG. 17. Specifically, the reference image frame 210 includes a co-located pixel 212 at the center of a co-located prediction unit in the reference image frame. In other words, the pixel 212 may be identified by a zero vector. As described above, the full-pel motion estimation block 76 may search one or more automatic inter-frame prediction modes 91. In some embodiments, the automatic inter-frame prediction modes 91 may be determined by applying an offset to the co-located pixel 212. For example, in the depicted embodiment, full-pel motion estimation block 76 may determine a first automatic inter-frame prediction mode 91A by applying a −3 vertical offset to the co-located pixel 212, a second automatic inter-frame prediction mode 91B by applying a −3 vertical offset and a +7 horizontal offset to the co-located pixel 212, and a third automatic inter-frame prediction mode 91C by applying a −3 vertical offset and a −7 horizontal offset to the co-located pixel 212. Additionally, the full-pel motion estimation block 76 may determine a fourth automatic inter-frame prediction mode 91D by applying a +3 vertical offset to the co-located pixel 212, a fifth automatic inter-frame prediction mode 91E by applying a +3 vertical offset and a +7 horizontal offset to the co-located pixel 212, and a sixth automatic inter-frame prediction mode 91F by applying a +3 vertical offset and a −7 horizontal offset to the co-located pixel 212. Thus, when a +/−3 pixel area is searched for each initial candidate inter-frame prediction mode, the automatic inter-frame prediction modes may result in a 21×14 automatic pixel-search-area 214.

As such, initial candidate inter-frame prediction modes that indicate a pixel within the 21×14 automatic pixel search area 214 will result in a pixel search area at least partially overlapping the pixel search area. For example, in the depicted embodiment, a first initial candidate inter-frame prediction mode that indicates a first pixel 215 will result in a first 7×7 pixel search area 216 that completely overlaps with the 21×14 automatic pixel search area 214. In other words, the first 7×7 pixel search area 216 and the 21×14 automatic pixel search area 214 may have an overlap of forty-nine search locations. Additionally, a second initial candidate inter-frame prediction mode that indicates a second pixel 217 will result in a second 7×7 pixel search area 218 that partially overlaps with the 21×14 automatic pixel search area 214. More specifically, the second 7×7 pixel search area 218 may overlap with the 21×14 automatic pixel search area 214 at forty-two search locations.

In fact, overlapping pixel-search-areas may occur even when the location indicated by an initial candidate inter-frame prediction mode is outside the 21×14 automatic pixel-search-area 214. For example, when a +/−3 pixel-search-area is used, initial candidate inter-frame prediction modes that indicate a pixel located within a buffer zone 220 may still result in overlapping pixel-search-areas. In the depicted embodiment, a third initial candidate inter-frame prediction mode that indicates a third pixel 222 will result in a third 7×7 pixel-search-area 224 that partially overlaps with the 21×14 automatic pixel-search-area 214. More specifically, the third 7×7 pixel-search-area 224 and the 21×14 automatic pixel-search-area 214 may have an overlap of twenty-one search locations. Additionally, a fourth initial candidate inter-frame prediction mode that indicates a fourth pixel 226 will result in a fourth 7×7 pixel-search-area 228 that partially overlaps with the 21×14 automatic pixel-search-area 214. In the depicted embodiment, the fourth 7×7 pixel-search-area 228 may overlap with the 21×14 automatic pixel-search-area 214 at fourteen search locations.

Thus, the motion estimation block 74 may select initial candidate inter-frame prediction modes based at least in part on location indicated and/or resulting pixel-search-area to improve quality of the initial candidate inter-frame prediction modes evaluated by the full-pel motion estimation block 76. In some embodiments, the initial candidate inter-frame prediction modes may be replaced and/or adjusted (e.g., modified) based at least in part on resulting amount of search overlap.

Figure 18:
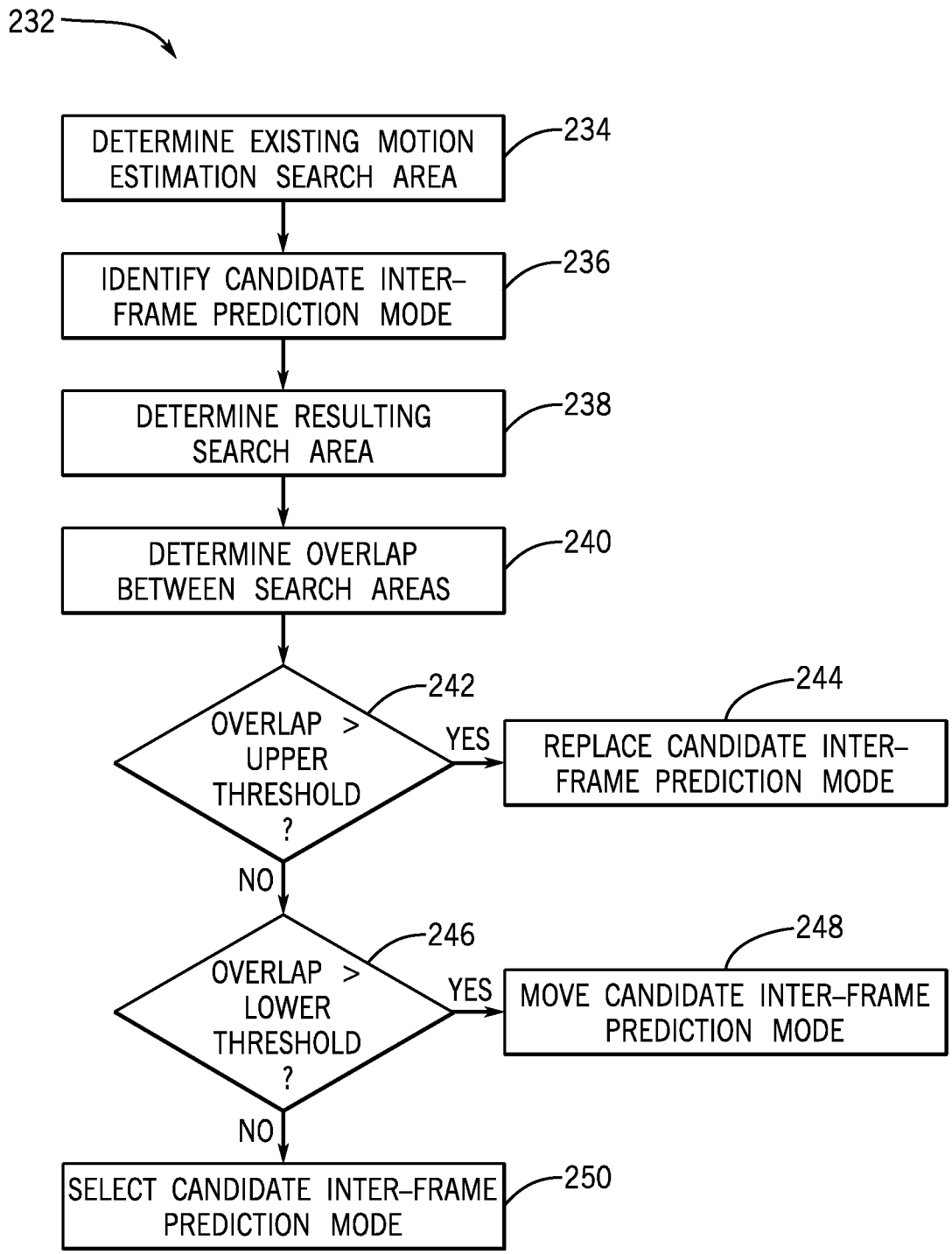
FIG. 18 is a flow diagram of a process for selecting initial candidate inter-frame prediction modes based on location and/or resulting pixel-search-area, in accordance with an embodiment.

To help illustrate, one embodiment of a process 230 for selecting candidate inter-frame prediction modes as initial candidate inter-frame prediction modes based on amount of overlapping pixel search area is described in FIG. 18. Generally, the process includes determining an existing motion estimation pixel search area (process block 234), identifying a candidate inter-frame prediction mode (process block 236), determining a resulting pixel search area (process block 238), determining amount of overlap between the pixel search areas (process block 240), determining whether the amount of overlap is greater than an upper threshold (decision block 242), replacing the candidate inter-frame prediction mode when amount of overlap is greater than the upper threshold (process block 244), determining whether the amount of overlap is greater than a lower threshold when the amount of overlap is not greater than the upper threshold (decision block 246), moving the candidate inter-frame predication mode when amount of overlap is greater than the lower threshold (process block 248), and selecting the candidate inter-frame prediction mode when the amount of overlap is not greater than the lower threshold (process block 250). In some embodiments, the process 232 may be implemented by executing instructions stored in a tangible, non-transitory, computer-readable medium, such as video encoding pipeline memory 72, controller memory 44, the local memory 20, the main memory storage device 22, or the like, using processing circuitry, such as the controller processor 42, the processor complex 18, a graphics processing unit (GPU), or the like.

Accordingly, in some embodiments, the controller 40 may instruct the motion estimation block 52 to determine an existing pixel-search-area (process block 234). As described above, the existing pixel-search-area may be the result of automatic inter-frame prediction modes 91. Additionally, the existing pixel-search-area may be the result of previously selected initial candidate inter-frame prediction modes.

The controller 40 may also instruct the motion estimation block 52 to identify a candidate inter-frame prediction mode (process block 236). As described above, the motion estimation block 52 may identify candidate inter-frame prediction modes that may be used as initial candidate inter-frame prediction modes based on a setup configuration 80. For example, the motion estimation block 52 may receive a candidate inter-frame prediction mode, such as a low resolution inter-frame prediction modes 82 or a controller inter-frame prediction mode 84, from the video encoding pipeline memory 72. Additionally, the motion estimation block 52 may receive a related inter-frame prediction mode (e.g., from the mode decision block 58 or the video encoding pipeline memory 72) and determine a predictor inter-frame prediction mode, such as a top predictor inter-frame prediction mode 86, a left predictor inter-frame prediction mode 88, or a co-located inter-frame prediction mode, based at least in part on the related inter-frame prediction mode.

The controller 40 may then instruct the motion estimation block 52 to determine a pixel-search-area resulting from the candidate inter-frame prediction mode (process block 238). In some embodiments, the motion estimation block 52 may determine a location indicated by the candidate inter-frame prediction mode. As described above, the candidate inter-frame prediction unit may include a reference index to indicate the reference image frame (e.g., temporal position) and a motion vector to indicate offset (e.g., spatial position) relative to a co-located prediction unit in the reference image frame. The motion estimation block 52 may also determine the pixel area around each location search by the full-pel motion estimation block 76 and, thus, the resulting pixel-search-area of the candidate inter-frame prediction mode.

Additionally, the controller 40 may instruct the motion estimation block 52 to determine amount of overlap between the existing pixel-search-area and the pixel-search-area resulting from the candidate inter-frame prediction mode (process block 240). In some embodiments, the motion estimation block 52 may determine the amount of overlap by determining the number of locations included in both the existing pixel-search-area and the pixel-search-area resulting from the candidate inter-frame prediction mode.

The controller 40 may then instruct the motion estimation block 52 to determine whether the amount of overlap is greater than a replace (e.g., upper) threshold (process block 244). In some embodiments, the upper threshold may be set so that candidate inter-frame prediction modes that indicate a location within the existing pixel-search-area will result in overlap greater than the upper threshold. Additionally or alternatively, the upper threshold may be set so that candidate inter-frame prediction modes that indicate a location outside the existing pixel-search-area will result in an overlap that is not greater than the upper threshold. Furthermore, in some embodiments, the upper threshold may be set by the setup configuration 80.

Thus, when the amount of overlap is greater than the upper threshold, the controller 40 may instruct the motion estimation block 52 to replace the candidate inter-frame prediction mode with another candidate (process block 244). To help illustrate, reference is made to the reference image frame 210 described in FIG. 17. In the depicted embodiment, the upper threshold may be equal to twenty-one. In other words, candidate inter-frame prediction modes that result in a pixel-search-area that overlap with the 21×14 automatic pixel-search-area 214 by more than twenty-one locations may be replaced. As such, the first candidate inter-frame prediction mode and the second inter-frame prediction mode may both be replaced.

In some embodiments, the motion estimation block 52 may identify the replacement candidate inter-frame prediction mode based at least in part on the setup configuration 80. Thus, the replacement candidate inter-frame prediction mode may be the same type as the candidate inter-frame prediction mode. For example, a 16×16 low resolution inter-frame prediction mode 82 may be replaced by another 16×16 low resolution inter-frame prediction mode 82. In some embodiments, the motion estimation block 52 may again determine whether to replace and/or modify the replacement candidate inter-frame prediction mode based on amount of overlap a resulting search has with the existing pixel-search-area.

Returning to the process 232 described in FIG. 18, the controller 40 may also instruct the motion estimation block 52 to determine whether the amount of overlap is greater than a move (e.g., lower) threshold (process block 246). In some embodiments, the lower threshold may be set so that candidate inter-frame prediction modes that indicate a location within a buffer zone 220 will result in overlap greater than the lower threshold, but less than the upper threshold. Additionally or alternatively, the lower threshold may be set so that candidate inter-frame prediction modes that indicate a location outside the exiting pixel-search-area and the buffer zone 220 will result in overlap that it not greater than the lower threshold. Furthermore, in some embodiments, the lower threshold may be set by the setup configuration 80.

Thus, when the amount of overlap is not greater than the lower threshold, the controller 40 may instruct the motion estimation block 52 to select the candidate inter-frame prediction mode as an initial candidate inter-frame prediction mode evaluated by the full-pel motion estimation block 76 (process block 250). On the other hand, when the amount of overlap is greater than the lower threshold, but not greater than the upper threshold, the controller 40 may instruct the motion estimation block 52 to move (e.g., modify or adjust) the candidate inter-frame prediction mode (process block 248). In some embodiments, the motion estimation block 52 may modify the candidate inter-frame prediction mode to move the identified location.

To help illustrate, reference is again made to the reference image frame 210 described in FIG. 17. In the depicted embodiment, the lower threshold may be set at zero. In other words, candidate inter-frame prediction modes that result in overlap between one and twenty-one may be modified to reduce amount of overlap. As such, the third candidate inter-frame prediction mode and the fourth inter-frame prediction mode may both be adjusted to move indicated locations.

In some embodiments, the motion estimation block 52 may modify the motion vector of the candidate inter-frame prediction mode to move the location indicated outside the existing pixel-search-area and the buffer zone 220. For example, in the depicted embodiment, the third candidate inter-frame prediction mode may be modified such that identified location 222 is shifted up three pixels. Additionally, the fourth inter-frame prediction mode may be modified such that identified location 226 is shifted left two pixels.

In this manner, the motion estimation block 52 may select initial candidate inter-frame prediction modes evaluated by the full-pel motion estimation block 76 to reduce amount of searching overlap. As such, selecting inter-frame prediction modes based on location and/or resulting pixel-search-area may improve quality of the initial candidate inter-frame prediction modes, which may facilitate reducing search duration and, thus, real-time or near real-time transmission and/or display of encode image data.

Improved Motion Estimation Searching

As described above, the motion estimation block 52 may perform one or more motion estimation searches to determine candidate inter-frame prediction modes used to encode a coding unit. Additionally, as described above, the coding unit may include one or more prediction units. In fact, the coding unit may have multiple possible prediction unit configurations. For example, in a first prediction unit configuration, a 32×32 coding unit may include a single 32×32 prediction unit. On the other hand, in a second prediction unit configuration, the 32×32 coding unit may include four 16×16 prediction units. Thus, the motion estimation block may determine candidate inter-frame prediction modes for the various possible prediction unit configurations.

To improve operational efficiency, processing of motion estimation search results may be improved. In some instances, results of a motion estimation search may be relevant to multiple prediction unit configurations. For example, a match metric determined for a smaller prediction unit encompassed by a larger prediction unit may be used to determine a match metric from the larger prediction unit.

Figure 19:
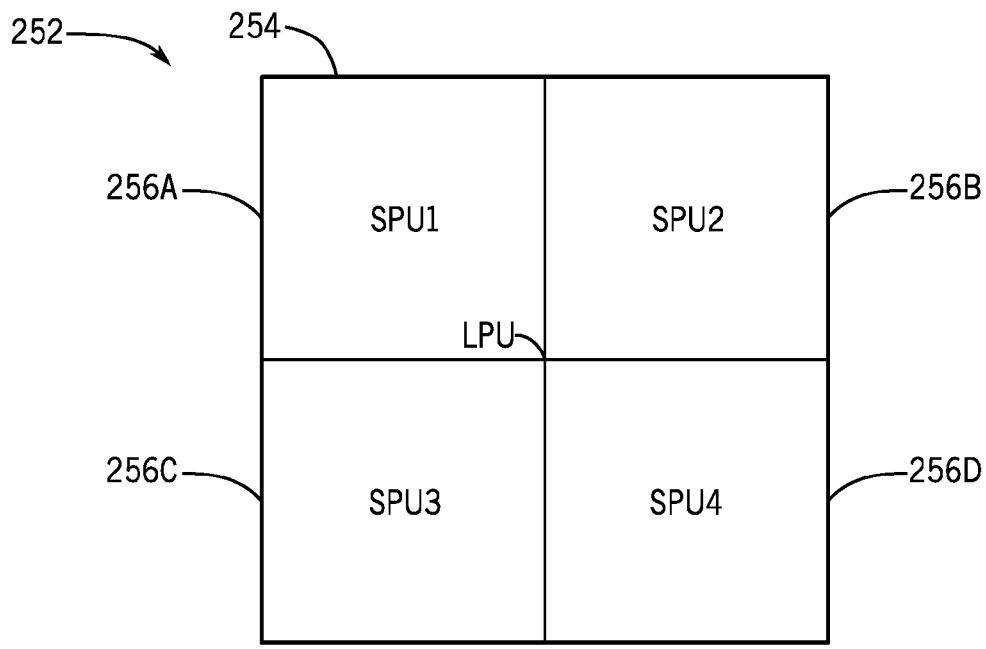
FIG. 19 is a diagrammatic representation of a coding unit in various prediction unit configurations, in accordance with an embodiment.

To help illustrate, a diagrammatic representation of a coding unit 252 is described in FIG. 19. In some embodiments, the coding unit 252 may include multiple possible prediction unit configurations. For example, in a first possible prediction unit configuration, the coding unit 252 may include a single large prediction unit (LPU) 254. Additionally, in a second possible prediction unit configuration, the coding unit 252 may include four small prediction units 256, which include a first small prediction unit (SPU1) 256A, a second small prediction unit (SPU2) 256B, a third small prediction unit (SPU3) 256C, and a fourth small prediction unit (SPU4) 256D. Thus, when the coding unit 252 is a 32×32 coding unit the large prediction unit 254 may be a 32×32 prediction unit and the small prediction units 256 may be 16×16 prediction units.

To determine candidate inter-frame prediction modes for the coding unit 252, the motion estimation block 52 may perform motion estimation searches for the large prediction unit 254 and each of the small prediction units 256. As described above, the motion estimation block 52 may perform motion estimation searches to determine a reference sample for a prediction unit and determine a candidate inter-frame prediction mode to indicate location of the reference sample. Additionally, as described above, candidate inter-frame prediction modes may be sorted and input to the mode decision block 58 based at least in part on associated motion vector costs. As such, motion estimation block 52 may determine a motion vector cost associated each candidate inter-frame prediction modes determined for the large prediction unit 254 and each candidate inter-frame prediction modes determined for the small prediction units 256.

In some embodiments, the motion vector cost may include a match metric used to indicate similarity between a prediction unit and a reference sample. For example, the match metric may be the sum of absolute difference (SAD) or sum of absolute transformed difference (SATD) between the reference sample and the prediction unit. As such, the motion estimation block 52 may determine a match metric for each candidate inter-frame prediction modes determined for the large prediction unit 254 and each candidate inter-frame prediction modes determined for the small prediction units 256.

In some embodiments, match metrics determined for the small prediction units 256 may be used to determine a match metric for the large prediction unit 254. For example, the match metric for the large prediction unit 254 may be determine by summing the match metrics determined for each of the small prediction units 256. Thus, in some embodiments, the match metric for the large prediction unit 254 may be determined in parallel with the match metrics for the small prediction units 256, which may facilitate improving operational efficiency of the motion estimation block 52.

Figure 20:
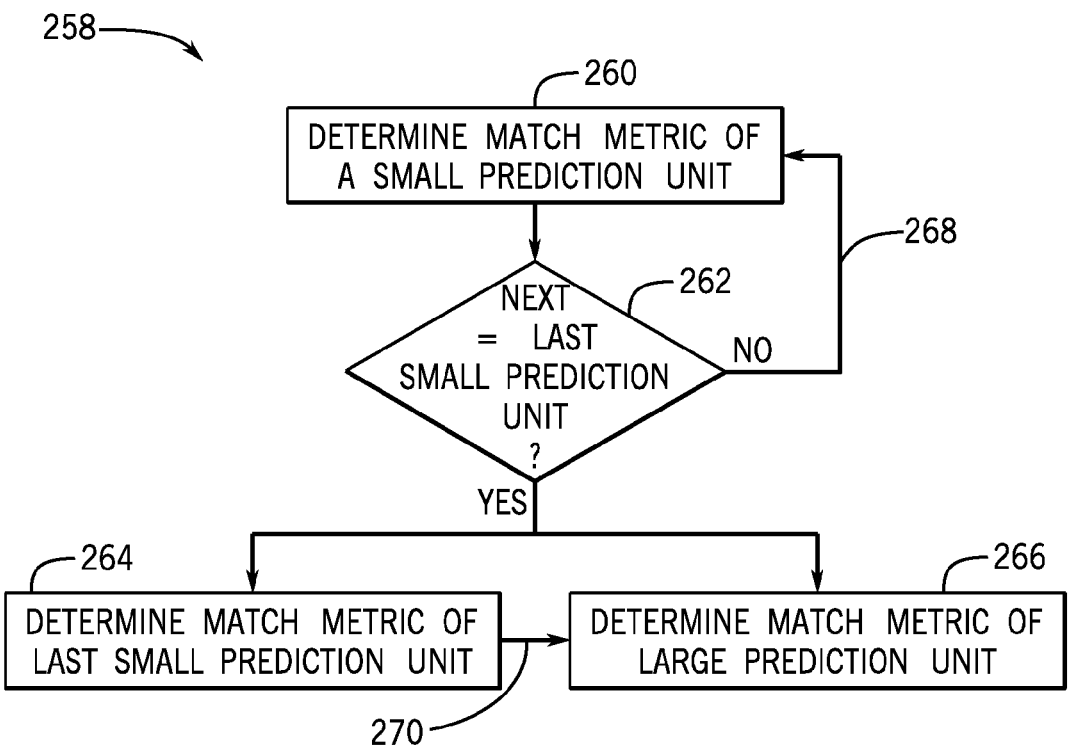
FIG. 20 is a flow diagram of a process for determining a match metric for prediction units in the coding unit of FIG. 19, in accordance with an embodiment.

To help illustrate, a process 258 for determining the match metric of small prediction units 256 and large prediction units 254 is described in FIG. 20. Generally, the process 258 includes determining a match metric of a small prediction unit (process block 260) and determining whether a next small prediction unit is the last small prediction unit (decision block 262). When the next small prediction unit is the last small prediction unit, the process 258 includes determining a match metric of the last small prediction unit (process block 264) and determining a match metric of the large prediction unit (process block 266) in parallel. In some embodiments, the process 258 may be implemented by executing instructions stored in a tangible, non-transitory, computer-readable medium, such as video encoding pipeline memory 72, controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may instruct the motion estimation block 52 to determine a match metric of a small prediction unit (process block 260). As described above, the motion estimation block 52 may determine the match metric by comparing luma of the small prediction unit and luma of the reference sample. In some embodiments, the match metric of the small prediction unit may be stored in the video encoding pipeline memory 72 (e.g., using direct memory access) for subsequent use.

Additionally, the controller 40 may instruct the motion estimation block 52 to determine whether the next small prediction unit 256 is the last small prediction unit 256 in the coding unit 252 (decision block 262). When the next small prediction unit 256 is not the last small prediction unit 256, the controller 40 may instruct the motion estimation block 52 to determine a match metric for the next small prediction unit (arrow 268). In this manner, the motion estimation block 52 may sequentially determine the match metric for the small prediction units 256. For example, with regard to the coding unit 252 described in FIG. 19, the motion estimation block 52 may sequentially determine a match metric for the first small prediction unit 256A, a match metric for the second small prediction unit 256B, and a match metric for the third small prediction unit 256C.

Returning to the process 258 described in FIG. 20, the controller 40 may instruct the motion estimation block 52 to determine a match metric of the last small prediction unit 256 (process block 264) and a match metric of the large prediction unit 254 (process block 256) in parallel when the next small prediction unit 256 is the last small prediction unit 256. In some embodiments, while determining the match metric for the last small prediction unit 256, the motion estimation block 52 may begin determining the match metric for the large prediction units 254 by summing together the match metrics for the other small prediction units 256. For example, with regard to the coding unit 252 described in FIG. 19, the motion estimation block 52 may begin determining the match metric for the large prediction unit 254 by summing together the match metrics for the first small prediction unit 256A, the second small prediction unit 256B, and the third small prediction unit 256C while the match metric for the fourth small prediction unit 256D is being determined.

Returning to the process 258 described in FIG. 20, the controller 40 may instruct the motion estimation block 52 to complete determining the match metric for the large prediction unit 254 by adding in the match metric of the last small prediction unit 256 (arrow 270). In this manner, the motion estimation block 52 may determine match metric for variously sized prediction units in parallel to facilitate improving operational efficiency and, thus, real-time or near real-time transmission and/or display of encode image data.

Accordingly, the technical effects of the present disclosure include improving operational efficiency of a motion estimation block in a video encoding pipeline used to encode (e.g., compress) source image data. In some embodiments, setup configuration of a motion estimation block in the video encoding pipeline may be dynamically adjusted based on operational parameters of the video encoding pipeline, such as image frame resolution, display refresh rate, and/or desired power consumption. Specifically, adjusting the setup configuration may facilitate reducing operating duration of the motion estimation block, for example, by adjusting number and/or of type of initial candidate inter-frame prediction modes evaluated by the motion estimation block. To facilitate reducing operating duration, the quality of initial candidate inter-frame prediction modes may be improved, for example, by selecting predictor inter-frame prediction modes and/or selecting initial candidates based on identified location.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A computing device comprising a video encoding pipeline configured to receive source image data corresponding with a first image and to output encoded image data corresponding with the source image data, wherein the video encoding pipeline comprises:
    motion estimation setup circuitry configured to:
        determine a first pixel search area in a second image based at least in part on a first location indicated by a first initial candidate inter-frame prediction mode;
        determine a second pixel search area in the second image based at least in part on a second location indicated by a second initial candidate inter-frame prediction mode different from the first initial candidate inter-frame prediction mode; and
        adjust the second initial candidate inter-frame prediction mode to move the second pixel search area in the second image when a first amount of overlap between the first pixel search area and the second pixel search area is between an upper threshold and a lower threshold; and
    motion estimation circuitry coupled to the motion estimation setup circuitry, wherein the motion estimation circuitry is configured to perform a first motion estimation search in the first pixel search area and the second pixel search area when the first amount of overlap between the first pixel search area and the second pixel search area is not greater than the upper threshold to facilitate determining a final candidate inter-frame prediction mode; and
    mode decision circuitry coupled to the motion estimation circuitry, wherein the mode decision circuitry is configured to:
        determine a rate-distortion cost associated with the final candidate inter-frame prediction mode based at least in part on a comparison of the source image data and a prediction sample resulting from application of the final candidate inter-frame prediction mode to other image data; and
        determine a prediction mode used to prediction encode the source image data based at least in part on the rate-distortion cost associated with the final candidate inter-frame prediction mode, wherein the encoded image data is generated to indicate the prediction mode.

2. The computing device of claim 1, wherein the motion estimation circuitry is configured to:
    perform the first motion estimation search in the first pixel search area and the second pixel search area at a full-pel resolution when the first amount of overlap between the first pixel search area and the second pixel search area is not greater than the upper threshold to facilitate determining an intermediate candidate inter-frame prediction mode;

determine a third pixel search area in the second image based at least in part on a third location indicated by the intermediate candidate inter-frame prediction mode; and perform a second motion estimation search in the third pixel search area at a sub-pel resolution to facilitate determining the final candidate inter-frame prediction mode.

3. The computing device of claim 1, wherein the video encoding pipeline comprises:

inter-frame prediction circuitry configured to determine a first luma prediction sample based at least in part on the final candidate inter-frame prediction mode;

intra-frame prediction circuitry configured to determine a candidate intra-frame prediction mode and to determine a second luma prediction sample based at least in part on the candidate intra-frame prediction mode;

chroma reconstruction circuitry configured to determine chroma components of reconstructed image data based at least in part on the prediction mode determined by the mode decision circuitry;

luma reconstruction circuitry configured to determine a luma component of the reconstructed image data based at least in part on the prediction mode determined by the mode decision circuitry;

back-end-filter circuitry configured to filter the reconstructed image data; and syntax element binarization circuitry configured to generate binarized syntax elements used to indicate the prediction mode determined by the mode decision circuitry; and a transcode pipeline comprising circuitry configured to generate the encoded image data by entropy encoding the binarized syntax elements.

4. The computing device of claim 1, wherein the motion estimation setup circuitry is configured to:

determine a setup configuration comprising a first setup parameter that indicates number of initial candidate inter-frame prediction modes of a first type to be evaluated, a second setup parameter that indicates number of initial candidate inter-frame prediction modes of a second type different from the first type to be evaluated, and a third setup parameter that indicates search area size resulting from each initial candidate inter-frame prediction mode;

select the second initial candidate inter-frame prediction mode from a plurality of initial candidate inter-frame prediction modes based at least in part on the first setup parameter that indicates number of initial candidate inter-frame prediction modes of the first type to be evaluated; and determine the second pixel search area in the second image based at least in part on the third setup parameter that indicates search area size resulting from each initial candidate inter-frame prediction mode selected.

5. The computing device of claim 4, comprising a controller coupled to the motion estimation setup circuitry, wherein the controller is configured to:

determine operational parameters of the video encoding pipeline, wherein the operational parameters comprise image frame resolution, display refresh rate, remaining battery power, or any combination thereof; and dynamically adjust the setup configuration in response to changes in the operational parameters of the video encoding pipeline.

6. The computing device of claim 4, comprising a controller coupled to the motion estimation setup circuitry, wherein the controller is configured to:

determine an operation mode of the video encoding pipeline, wherein the operation mode is indicative of operating duration the video encoding pipeline is provided to encode the source image data; and dynamically adjust the setup configuration in response to changes in the operation mode of the video encoding pipeline.

7. The computing device of claim 1, wherein the motion estimation circuitry is configured to:

replace the second initial candidate inter-frame prediction mode with a third initial candidate inter-frame prediction mode when the first amount of overlap between the first pixel search area and the second pixel search area is greater than the upper threshold;

determine a third pixel search area in the second image based at least in part on a third location indicated by the third initial candidate inter-frame prediction mode; and perform the first motion estimation search in the first pixel search area and the third pixel search area when a second amount of overlap between the first pixel search area and the third pixel search area is not greater than the upper threshold.

8. The computing device of claim 1, wherein the computing device comprises a portable phone, a media player, a personal data organizer, a handheld game platform, a tablet device, a computer, or any combination thereof.

9. A tangible, non-transitory, computer-readable medium that store instructions executable by one or more processors in a video encoding pipeline, wherein the instructions comprise instructions to:

instruct, using the one or more processors, the video encoding pipeline to retrieve source image data corresponding with a first image;

instruct, using the one or more processors, the video encoding pipeline to determine a first pixel search area in a second image based at least in part on a first location identified by a first candidate inter prediction mode;

instruct, using the one or more processors, the video encoding pipeline to determine a second pixel search area in the second image based at least in part on a second location identified by a second candidate inter prediction mode different from the first candidate inter prediction mode;

instruct, using the one or more processors, the video encoding pipeline to adjust the second candidate inter prediction mode to move the second pixel search area in the second image when a first amount of overlap between the first pixel search area and the second pixel search area is between an upper threshold and a lower threshold;

instruct, using the one or more processors, the video encoding pipeline to perform a motion estimation search in the first pixel search area and the second pixel search area when the first amount of overlap between the first pixel search area and the second pixel search area is not greater than the upper threshold to facilitate determining a prediction mode to be applied to other image data to determine a prediction sample corresponding with the source image data; and instruct, using the one or more processors, the video encoding pipeline to output encoded image data generated to indicate the prediction mode and a prediction residual resulting from comparison of the prediction sample and the source image data.

10. The computer-readable medium of claim 9, comprising instructions to:
    determine, using the one or more processors, a setup configuration comprising a first setup parameter that indicates number of candidate inter prediction modes of a first type to be evaluated, a second setup parameter that indicates number of candidate inter prediction modes of a second type different from the first type to be evaluated, and a third setup parameter that indicates search area size resulting from each candidate inter prediction mode; and
    instruct, using the one or more processors, the video encoding pipeline to implement the setup configuration by:
        selecting the second candidate inter prediction mode from a plurality of candidate inter prediction modes based at least in part on the first setup parameter that indicates number of initial candidate inter prediction modes of the first type to be evaluated; and
        determining the second pixel search area in the second image based at least in part on the third setup parameter that indicates search area size resulting from each initial candidate inter prediction mode.

11. The computer-readable medium of claim 10, wherein the instructions to determine the setup configuration comprises instructions to:
    determine the first setup parameter of the setup configuration to indicate number of 16×16 initial candidate inter prediction modes to be evaluated; and
    determine the second setup parameter of the setup configuration to indicate number of 32×32 initial candidate inter prediction modes to be evaluated.

12. The computer-readable medium of claim 10, comprising instructions to determine, using the one or more processors, an operation mode of the video encoding pipeline based at least in part on resolution of the first image, refresh rate at which the first image is to be displayed, power allocated to encoding the source image data, or any combination thereof;
    wherein the instructions to determine the setup configuration comprise instructions to dynamically adjust the setup configuration based at least in part on the operation mode of video encoding pipeline.

13. The computer-readable medium of claim 9, comprising instructions to:
    instruct, using the one or more processors, the video encoding pipeline to replace the second candidate inter prediction mode with a third candidate inter prediction mode when the first amount of overlap between the first pixel search area and the second pixel search area is greater than the upper threshold;
    instruct, using the one or more processors, the video encoding pipeline to determine a third pixel search area in the second image based at least in part on a third location indicated by the third candidate inter prediction mode; and
    instruct, using the one or more processors, the video encoding pipeline to perform the motion estimation search in the first pixel search area and the third pixel search area when a second amount of overlap between the first pixel search area and the third pixel search area is not greater than the upper threshold to facilitate determining the prediction mode to be used to encode the source image data.

14. A method comprising:
    receiving, using a video encoding pipeline, source image data corresponding with a first image;
    determining, using the video encoding pipeline, a first pixel search area in a second image based at least in part on a first location indicated by a first candidate inter-frame prediction mode;
    determining, using the video encoding pipeline, a second pixel search area in the second image based at least in part on a second location indicated by a second candidate inter-frame prediction mode different from the first candidate inter-frame prediction mode;
    adjusting, using the video encoding, the second candidate inter-frame prediction mode to move the second pixel search area in the second image when a first amount of overlap between the first pixel search area and the second pixel search area is between an upper threshold and a lower threshold; and
    performing, using the video encoding pipeline, a motion estimation search in the first pixel search area and the second pixel search area when the first amount of overlap between the first pixel search area and the second pixel search area is not greater than the upper threshold to facilitate determining a prediction mode to be applied to other image data to determine a prediction sample corresponding with the source image data; and
    outputting, using the video encoding pipeline, encoded image data that indicates the prediction mode and a prediction residual resulting from comparison of the prediction sample and the source image data.

15. The method of claim 14, comprising:
    determining, using the video encoding pipeline, operational parameters of the video encoding pipeline used to encode the source image data, wherein the operational parameters of the video encoding pipeline comprise resolution of the first image, refresh rate to be used to display the first image, power consumption to be used to encode the source image data, or any combination thereof;
    determining, using the video encoding pipeline a setup configuration based at least in part on the operational parameters of the video encoding pipeline, wherein the setup configuration comprises setup parameters that indicate number of candidate inter-frame prediction modes of a first type to be evaluated and number of candidate inter-frame prediction modes of a second type different from the first type to be evaluated; and
    selecting, using the video encoding pipeline, the second candidate inter-frame prediction mode based at least in part on the setup configuration.

16. The method of claim 14, comprising:
    replacing, using the video encoding pipeline, the second candidate inter-frame prediction mode with a third candidate inter-frame prediction mode when the first amount of overlap between the first pixel search area and the second pixel search area is greater than the upper threshold;
    determining, using the video encoding pipeline, a third pixel search area in the second image based at least in part on a third location indicated by the third candidate inter-frame prediction mode; and
    performing, using video encoding pipeline, the motion estimation search in the first pixel search area and the third pixel search area when a second amount of overlap between the first pixel search area and the third pixel search area is not greater than the upper threshold to facilitate determining the prediction mode to be applied to other image data to determine the prediction sample corresponding with the source image data.

17. The method of claim 16, comprising adjusting, using the video encoding pipeline, the third candidate inter-frame prediction mode to move the third pixel search area in the second image when the second amount of overlap between the first pixel search area and the third pixel search area is between the upper threshold and the lower threshold.

18. The method of claim 14, comprising:
   determining, using the video encoding pipeline, a third pixel search area in the second image based at least in part on a third location indicated by a third candidate inter-frame prediction mode;
   adjusting, using the video encoding pipeline, the third candidate inter-frame prediction mode to move the third pixel search area in the second image when a second amount of overlap between the first pixel search area and the third pixel search area, a third amount of overlap between the second pixel search area and the third pixel search area, or both is between the upper threshold and the lower threshold; and
   performing, using the video encoding pipeline, the motion estimation search in the first pixel search area, the second pixel search area, and the third pixel search area when the first amount of overlap between the first pixel search area and the second pixel search area is not greater than the upper threshold, the second amount of overlap between the first pixel search area and the third pixel search area is not greater than the upper threshold, and the third amount of overlap between the second pixel search area and the third pixel search area is not greater than the upper threshold to facilitate determining the prediction mode to be applied to other image data to determine the prediction sample corresponding with the source image data.

19. The method of claim 14, wherein adjusting the second candidate inter-frame prediction mode comprises adjusting the second candidate inter-frame prediction mode to move the second pixel search area in the second image such that the first amount of overlap between the first pixel search area and the second pixel search area is not greater than the lower threshold.

20. The computing device of claim 1, wherein, when the first amount of overlap between the first pixel search area and the second pixel search area is between the upper threshold and the lower threshold, the motion estimation setup circuitry is configured to adjust the second initial candidate inter-frame prediction mode to move the second pixel search area to reduce the first amount of overlap between the first pixel search area and the second pixel search area below the lower threshold.

* * * * *

UNITED STATES PATENT AND TRADEMARK OFFICE
CERTIFICATE OF CORRECTION

PATENT NO. : 10,225,572 B2
APPLICATION NO. : 14/871848
DATED : March 5, 2019
INVENTOR(S) : Jim C. Chou et al.

Page 1 of 1

It is certified that error appears in the above-identified patent and that said Letters Patent is hereby corrected as shown below:

In the Claims

Column 44, Line 9 (Claim 6), please insert --an-- before "operating duration".

Column 44, Line 9 (Claim 6), please insert --that-- before "the video encoding pipeline".

Column 45, Line 49 (Claim 12), please insert --the-- before "video encoding pipeline".

Column 46, Line 16 (Claim 14), please insert --pipeline-- after "the video encoding".

Column 46, Line 65 (Claim 16), please insert --the-- before "video encoding pipeline".

Signed and Sealed this
Twenty-fifth Day of February, 2020

Andrei Iancu
*Director of the United States Patent and Trademark Office*